(12) United States Patent
Liu et al.

(10) Patent No.: US 9,379,374 B2
(45) Date of Patent: Jun. 28, 2016

(54) METHODS FOR FORMING NEGATIVE ELECTRODE ACTIVE MATERIALS FOR LITHIUM-BASED BATTERIES

(71) Applicant: GM Global Technology Operations LLC, Detroit, MI (US)

(72) Inventors: Zhongyi Liu, Troy, MI (US); Xingcheng Xiao, Troy, MI (US); Michael K. Carpenter, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 177 days.

(21) Appl. No.: 14/332,184

(22) Filed: Jul. 15, 2014

(65) Prior Publication Data

US 2016/0020453 A1   Jan. 21, 2016

(51) Int. Cl.
*B05D 5/12* (2006.01)
*H01M 4/04* (2006.01)
*H01M 4/1391* (2010.01)
*H01M 4/38* (2006.01)
*H01M 4/36* (2006.01)
*H01M 4/583* (2010.01)
*H01M 4/02* (2006.01)

(52) U.S. Cl.
CPC .......... *H01M 4/0402* (2013.01); *H01M 4/1391* (2013.01); *H01M 4/366* (2013.01); *H01M 4/386* (2013.01); *H01M 4/583* (2013.01); *H01M 2004/027* (2013.01); *H01M 2220/10* (2013.01); *H01M 2220/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0100438 | A1* | 4/2012 | Fasching | H01M 4/133 429/339 |
| 2014/0234721 | A1* | 8/2014 | Yang | H01M 4/364 429/231.8 |

FOREIGN PATENT DOCUMENTS

CA   2746752   7/2010

* cited by examiner

*Primary Examiner* — Austin Murata
(74) *Attorney, Agent, or Firm* — Dierker & Kavanaugh, P.C.

(57) ABSTRACT

In an example method, a transition metal precursor is selected so its transition metal has a diffusion rate that is slower than a diffusion rate of silicon. An aqueous mixture is formed by dissolving the precursor in an aqueous medium, and adding silicon particles to the medium. The mixture is exposed to a hydroxide, which forms a product including the silicon particles and a transition metal hydroxide precipitate. The product is dried. In an inert or reducing environment, silicon atoms of the silicon particles in the dried product are caused to diffuse out of, and form voids in and/or at a surface of, the particles. At least some silicon atoms react with the transition metal hydroxide in the dried product to form i) a $SiO_x$ ($0<x\leq2$) coating on the silicon particles and ii) the transition metal, which reacts with other silicon atoms to form silicides.

19 Claims, 13 Drawing Sheets

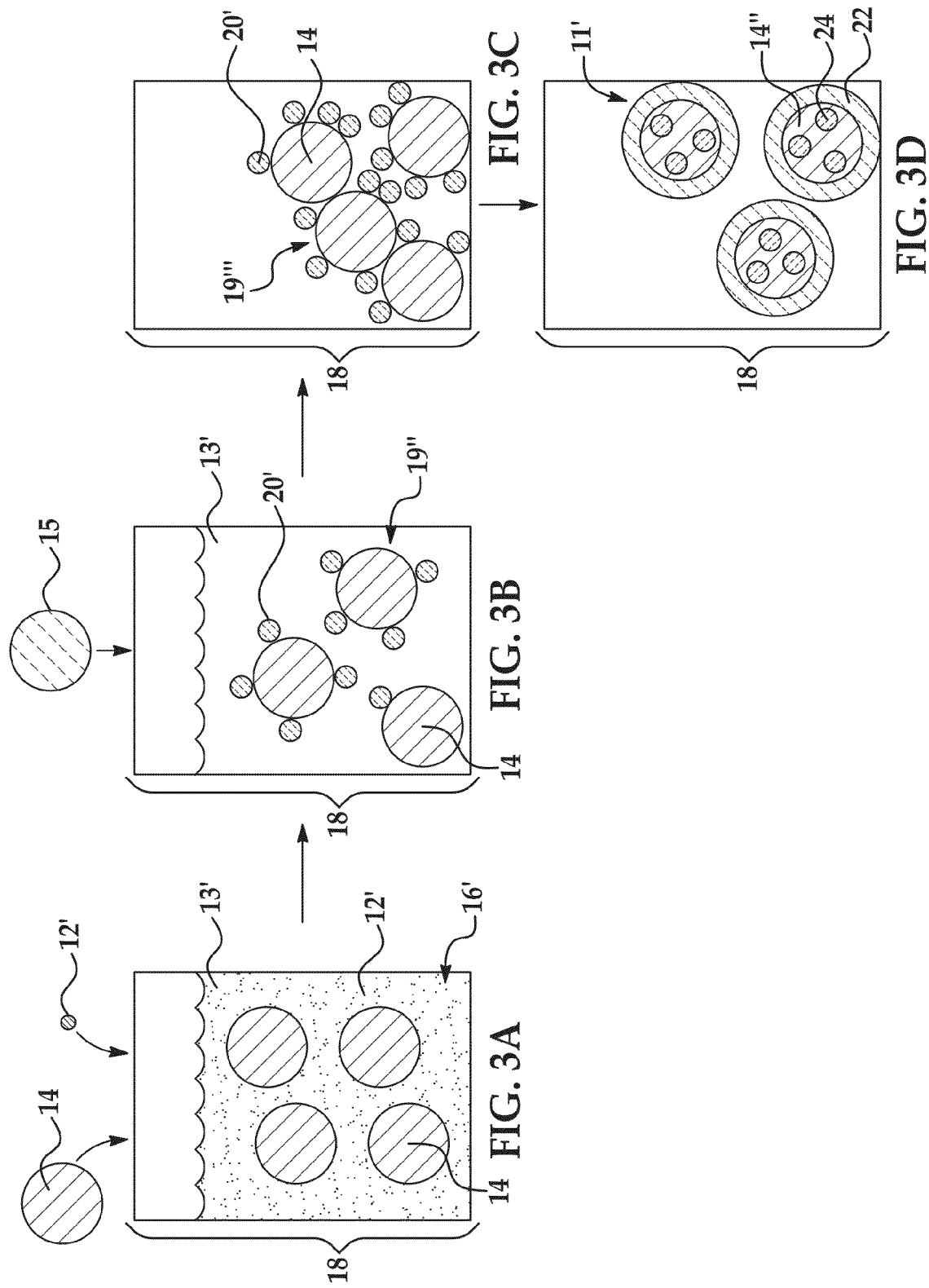

METHODS FOR FORMING NEGATIVE ELECTRODE ACTIVE MATERIALS FOR LITHIUM-BASED BATTERIES

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

Examples of various methods for forming a negative electrode active material are disclosed herein. In an example of the method, a transition metal precursor is selected. The transition metal that is selected has a diffusion rate that is slower than a diffusion rate of silicon. An aqueous mixture is formed by dissolving the transition metal precursor in an aqueous medium and adding silicon particles to the aqueous medium. The aqueous mixture is exposed to a hydroxide, and thus a product including a transition metal hydroxide precipitate and the silicon particles is formed. The product is dried. In an inert or reducing environment, the silicon atoms of the silicon particles in the dried product are caused to diffuse out of the silicon particles, and thus voids are formed in the silicon particles, on a surface of the silicon particles, or both in and on the surface of the silicon particles. At least some of the silicon atoms react with the transition metal hydroxide in the dried product to form i) a $SiO_x$ ($0<x\leq2$) coating on the silicon particles and ii) the transition metal. At least some other of the silicon atoms react with the transition metal to form silicides.

Examples of the negative electrode active material disclosed herein may be included in a negative electrode for a lithium ion battery or a lithium-sulfur battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A-3D are schematic and partially cross-sectional diagrams which together illustrate an example of another method for forming a precursor of another example of the negative electrode active material;

DETAILED DESCRIPTION

The high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 400%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

The examples of the methods disclosed herein form silicon-based negative electrode active materials that can improve the cycling performance of the negative electrode and battery in which the materials are used. In particular, the cycling performance is improved as a result of voids that are formed within the silicon particles. These voids provide space that can accommodate the volume expansion of the silicon, and thus can reduce the stress on the silicon. It is believed that the voids within the silicon particles contribute to a reduction in fracturing, decrepitating, or mechanical degradation that would otherwise lead to the capacity fading during the charging and discharging process.

In some examples of the methods disclosed herein, silicides are produced within the silicon particles. Most of the silicides are removed. However, the small amount of silicides that remain in the silicon particles may provide enhanced mechanical strength and electrical conductivity.

The example methods disclosed herein are efficient for producing void spaces within active silicon materials and/or at the surfaces of active silicon materials. In some of the methods disclosed herein, the Kirkendall effect is utilized. The Kirkendall effect is the motion of the boundary layer between two metals that occurs from the difference in diffusion rates of the metal atoms. Exploiting the Kirkendall effect, the present inventors have found that voids may advantageously and readily be formed inside of the silicon. In some other of the methods disclosed herein, the diffusion rate of metal atoms is utilized to generate silicides within and/or at the surface of the silicon (which are later removed to create voids).

Figure 1:
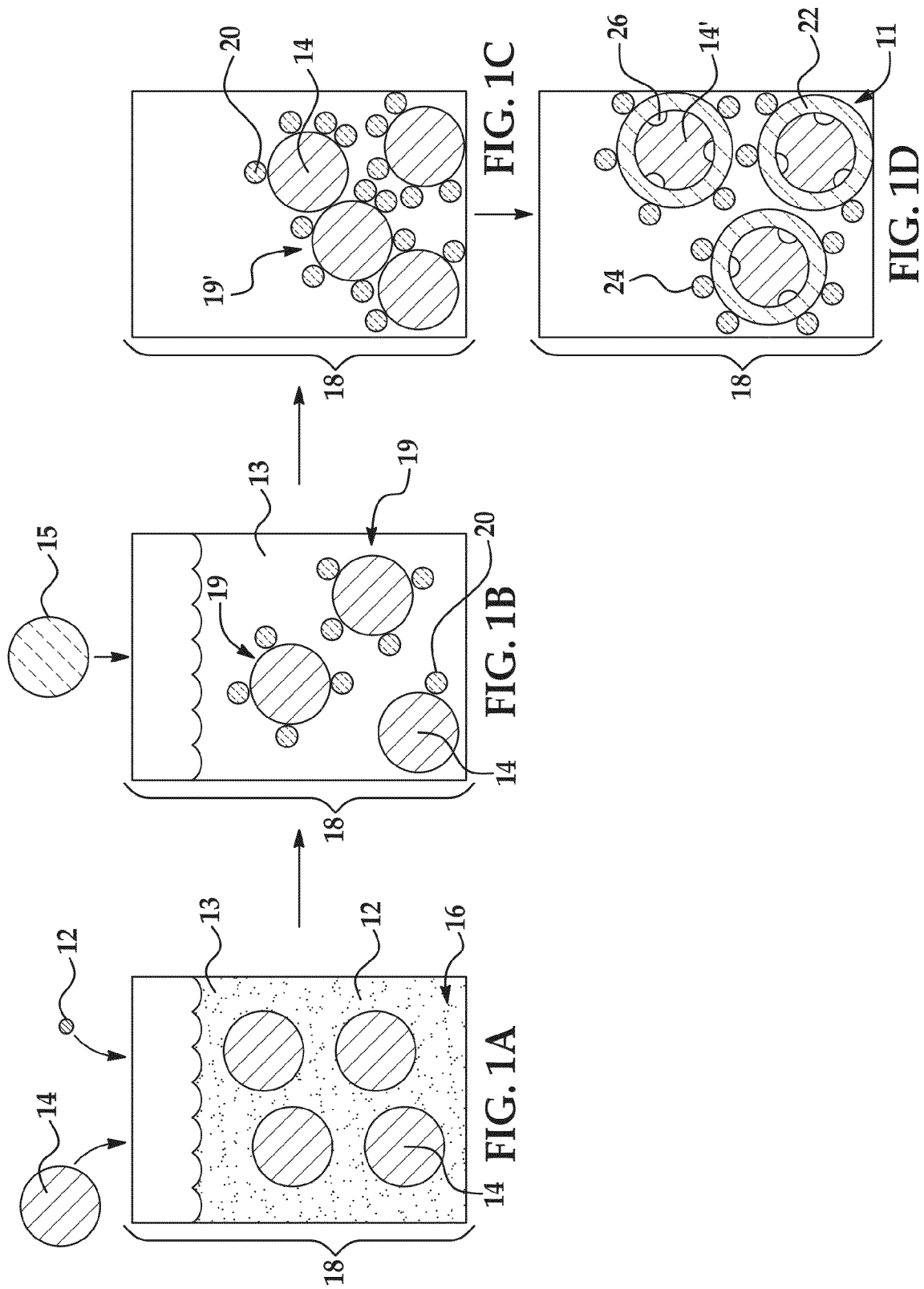
FIGS. 1A-1D are schematic and partially cross-sectional diagrams which together illustrate an example of the method for forming an example of the negative electrode active material.

Referring now to FIGS. 1A-1D, an example of the method for forming the negative electrode active material is depicted. In FIG. 1A, a transition metal precursor 12 is selected that includes a transition metal that has a diffusion rate that is slower than the diffusion rate of silicon. As such, when exposed to certain condition(s), the silicon atoms will diffuse faster than the selected transition metal atoms. This allows any reactions involving the silicon atoms to take place outside the silicon particle 14. More particularly, this allows silicides 24 (shown in FIG. 1D) to form outside a silicon particle 14 and simultaneously allows voids 26 (shown in FIG. 1D) to form within the silicon particle 14.

The transition metal precursor 12 may be a compound of the transition metal and a suitable anion. In an example, the transition metal precursor 12 is water soluble. In this example of the method, suitable transition metals, which have a diffusion rate that is slower than the diffusion rate of silicon, consist of chromium and titanium. Examples of suitable anions include nitrate ions ($NO_3^-$), chloride ions ($Cl^-$), sulfate ions ($SO_4^-$), acetate ions ($CH_3COO^-$), etc.

In the example shown in FIG. 1A, the transition metal precursor 12 is introduced into a container 18 with silicon particles 14 and an aqueous medium 13 capable of dissolving the transition metal precursor 12 and of having the silicon particles 14 dispersed therein. In an example, the aqueous medium 13 may be water alone or water in combination with a solvent that is at least miscible in the water (e.g., isopropyl alcohol, methanol, ethanol, acetone, etc.).

In an example, the transition metal precursor 12 may be added to the aqueous medium 13 in the container 18 to form an aqueous solution. The precursor 12 and liquid may be stirred until the transition metal precursor 12 is completely dissolved. Mixing may be accomplished (e.g., using a magnetic stir bar, ultrasonic vibration, etc.) for any suitable time to dissolve the transition metal precursor 12. In an example, the mixing time is about 10 minutes. After mixing and dissolution of the transition metal precursor 12, the aqueous solution may be homogeneous. The dissolved transition metal precursor 12 is represented by the speckles in the aqueous medium 13 in FIG. 1A.

In this example, once the transition metal precursor 12 is fully dissolved to form the aqueous solution, the silicon particles 14 may be added to the aqueous solution. The components may be mixed to form the aqueous mixture 16 shown in FIG. 1A (which includes the transition metal precursor 12 dissolved in the aqueous medium and the silicon particles 14 dispersed in the aqueous medium). Mixing may be accomplished by stirring the components until the silicon particles 14 are evenly dispersed throughout aqueous solution to form the aqueous mixture 16. The components may be mixed using a magnetic stir bar for a time ranging from about 10 minutes to about 30 minutes in order to fully disperse the silicon particles 14 and form the aqueous mixture 16. Mixing may be performed in any other desirable manner, e.g., manually or other mechanical stirring mechanism.

In another example, the transition metal precursor 12 and the silicon particles 14 may be added to the aqueous medium 13 simultaneously in the container 18 to form an aqueous mixture 16. When the transition metal precursor 12 and the silicon particles 14 are added, the aqueous medium 13 is stirred until the precursor 12 dissolves, the silicon particles 14 are dispersed, and the mixture 16 is formed. In still another example, the silicon particles 14 may be added to the aqueous medium 13 in the container 18 to form an aqueous dispersion. In this example, the transition metal precursor 12 may be added to the aqueous dispersion, and the components may be mixed until the precursor 12 is dissolved and the mixture 16 is formed.

Throughout the methods, appropriate amounts of the solvent (e.g., isopropyl alcohol, methanol, ethanol, acetone, etc.) may be added in order to reduce the water surface tension so that the silicon particles 14 can be readily wetted.

In one specific example, the aqueous mixture 16 is formed by weighing out a desired amount (e.g., 3.5587 g) of Cr$(NO_3)_3 \cdot 9H_2O$ as the transition metal precursor 12, and adding the precursor 12 to about 200 mL of deionized water. The precursor 12 and water are stirred for about 10 minutes, until the Cr$(NO_3)_3 \cdot 9H_2O$ is completely dissolved. About 2 g of the silicon particles 14 is added to the aqueous solution, and stirred until the mixture 16 is formed. The amounts of each of the precursor 12, the silicon particles 14, and the aqueous medium may be varied, but are generally included so that up to 25% of total silicon is converted into a silicide.

In an example, the silicon particles 14 may have a diameter ranging from about 30 nm to about 70 nm. In another example, the silicon particle diameter may range from about 30 nm to about 50 nm. In still another example, the silicon particle diameter may range from about 50 nm to about 70 nm. As such, the silicon particles 14 may also be referred to as nanoparticles. The silicon particles 14 may be a plurality of nanoparticles, such as a silicon powder (e.g., silicon nanopowders). In addition, the silicon particles 14 may have different morphologies, such as spherical particles, nanofibers, etc.

Referring to FIG. 1B, the aqueous mixture 16 including the dispersed silicon particle 14 and the dissolved transition metal precursor 12, is exposed to a hydroxide 15 to form a product 19, which includes the silicon particles 14 and a transition metal hydroxide precipitate 20. Some suitable hydroxides 15 include, for example, sodium hydroxide (NaOH), ammonium hydroxide ($NH_4OH$), calcium hydroxide ($Ca(OH)_2$), or potassium hydroxide (KOH). The amount of hydroxide 15 that is added will depend upon the amount of transition metal precursor 12 in the aqueous mixture 16. In general, the hydroxide 15 amount is sufficient to precipitate out transition metal hydroxide. In an example, the molar amount of the hydroxide 15 that is added is about 2.5 times the molar amount of the transition metal precursor 12 present in the aqueous mixture 16.

The hydroxide 15 added to the aqueous mixture 16 reacts with the dissolved transition metal precursor 12 to form the transition metal hydroxide precipitate 20. As such, the transition metal hydroxide precipitate 20 that is formed depends upon the transition metal in the precursor 12. Transition metal hydroxide precipitates 20 may include, for example, chromium hydroxide ($Cr(OH)_3$) and titanium hydroxide ($Ti(OH)_4$).

The transition metal hydroxide precipitate 20 precipitates out of mixture 16. In an example, the transition metal hydroxide precipitate 20 may be uniformly mixed with the silicon particles 14. As shown in FIG. 1B, the transition metal hydroxide precipitates 20 may precipitate onto the surface of the silicon particles 14 to form aggregate particles, which are an example of the product 19. The transition metal hydroxide precipitates 20 may also or alternatively be in contact with and/or adjacent to the silicon particles 14.

The formation of the product 19 enables the precipitate 20 and the silicon particles 14 to be isolated from the aqueous medium 13 of the mixture 16 before forming the negative electrode active material. Product 19 isolation also separates out any undesirable cations from the base and/or anions from the transition metal precursor 12 that remain in the aqueous medium after the precipitation takes place. In turn, this prevents the formation of any undesirable products in the negative electrode active material.

Referring now to FIG. 1C, the product 19 (e.g., aggregates or mixtures of silicon particles 14 and precipitate 20 shown in FIG. 1B) that is formed is separated from the aqueous medium 13 (and any by-products remaining therein) using any known suitable filtration or centrifugation techniques. In an example, the product 19 in the aqueous medium 13 is subjected to vacuum filtration, which separates out the product 19 (i.e., silicon particles 14 and the precipitate 20). The product 19 is washed to remove any remaining aqueous medium 13.

The product 19 is then dried to form a dried product 19', which is a solid mixture of the silicon particles 14 and the transition metal hydroxide precipitate 20. In an example, the dried product 19' includes solid aggregates of the silicon particles 14 and the transition metal hydroxide precipitate 20. Drying may be accomplished at room temperature. Drying may also be accelerated by heating the product 19 to a suitable temperature that aids in liquid removal but does not initiate metal diffusion, e.g., about 60° C.

Turning to FIG. 1D, the dried product 19' is then placed into an inert or a reducing environment and is heated to a temperature ranging from about 800° C. to about 1100° C. The heat is applied for a time ranging from about 4 hours to about 8 hours. The temperature of the environment drives the diffusion of the silicon atoms out of the particles 14 of the dried product 19'. The heat initiated diffusion rate of the silicon atoms is faster than the diffusion rate of the transition metal in the transition metal hydroxide precipitate 20. As such, the silicon atoms diffuse (by the Kirkendall effect) out of the silicon particles 14 before transition metal atoms diffuse into the silicon particles 14. As a result, in an example, voids 26 are formed within the silicon particles 14 creating silicon particles having voids therein (shown as 14'). It is to be understood that the voids 26 may be formed closer to and/or on the surface of the silicon particle 14' and/or in the interior of the silicon particle 14'. The time that the heat is applied and/or the temperature of the heat that is applied to the silicon particles 14 and precipitate 20 determine, at least in part, where the voids 26 form in and/or on the silicon particle 14'.

The diffused silicon atoms participate in a redox reaction with the transition metal hydroxide precipitate 20 outside of the silicon particles 14'. In an example, during the redox reaction, the transition metal hydroxide precipitate 20 is reduced to the transition metal (e.g., transition metal ions reduce to metallic titanium, metallic chromium, etc.) and hydroxide ions or $H_2O$. The redox reaction involves the hydroxide ions reacting with the silicon particles 14, 14' to form a $SiO_x$ (where $0 < x \leq 2$) coating 22 on the silicon particles 14, 14'. In an example, the $SiO_x$ coating 22 is silicon monoxide, silicon dioxide, or silicon suboxide.

The redox reaction also involves the reduced transition metal reacting with excess silicon atoms to form silicides 24 outside of the silicon particles 14'. When a reducing environment is used, $H_2$ in the environment may contribute to the reduction of the transition metal ions during the redox reaction, and the resulting transitional metal atoms react with silicon atoms to the form the silicides 24.

It is to be understood that the size of the voids 26 within and/or at the surface of the silicon particles 14' can be controlled by the amount of time the precipitate is subjected to heating. A longer heating time allows more silicon atoms to diffuse out of the silicon particles 14. In addition, the temperature for heating may also be used to control the size of the voids 26 within the silicon particles 14'. A higher heating temperature causes more silicon atoms to diffuse out of the silicon particles 14. During heating of the dried precipitate, if the temperature and/or time is increased, the sizes of the voids 26 may also be increased. Smaller sized voids 26 are created by a shorter exposure time to heat and/or a lower temperature.

As mentioned above, heating may take place in an inert environment in order to prevent undesirable side reactions with oxygen from taking place. In an example, argon gas, nitrogen gas, or any other inert gas may be used to create the inert environment. Also as mentioned above, heating may take place in a reducing environment. As examples, 5% $H_2$ mixed with 95% argon gas or carbon monoxide (CO) may be used as the reducing environment. As mentioned above, the $H_2$ may participate in the redox reaction by reducing at least some of the transition metal ions in the transition metal hydroxide precipitate 20.

Once heating is accomplished for a suitable time, the silicon particle 14' is formed having voids 26 therein and/or thereon and having the $SiO_x$ coating 22 thereon. In an example, this is an active material precursor 11, which may be used in subsequent processing to various examples of the active material 10, 10', 10'', 10''', 10'''' (see FIG. 2). As shown in FIG. 1D, the active material precursor 11 also includes the silicides 24 outside of the $SiO_x$ coating 22.

Figure 2:
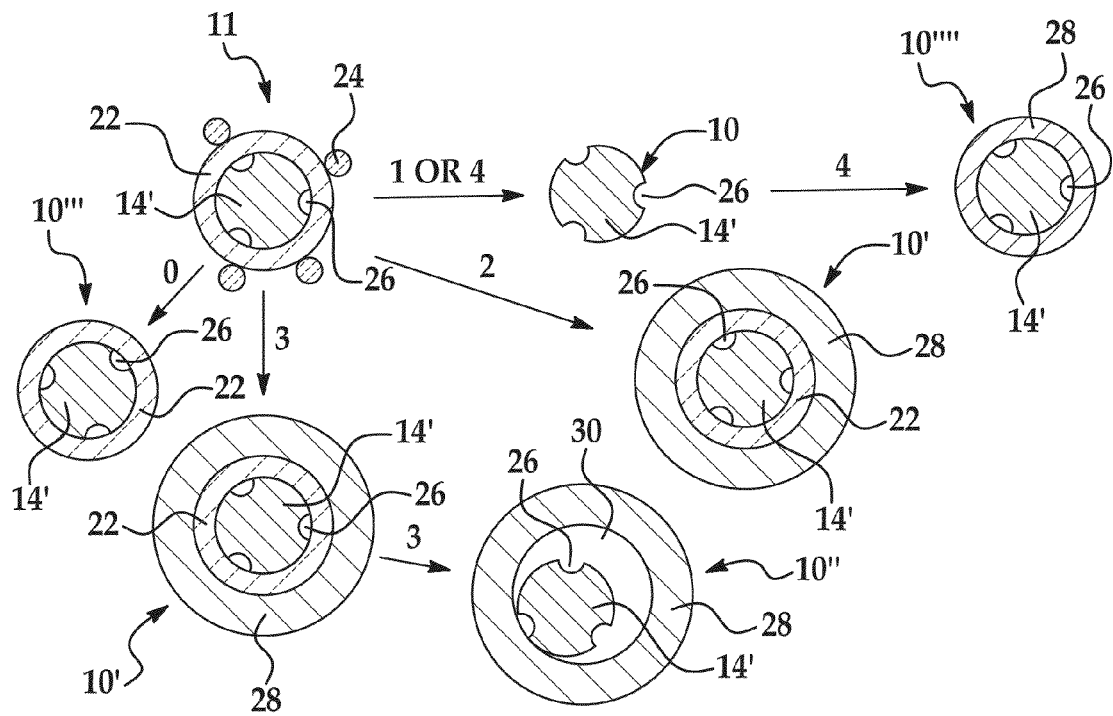
FIG. 2 is a cross-sectional view of an example of a negative electrode active material, an example of a multi-layered negative electrode active material, and an example of a carbon-coated negative electrode active material formed from the example of the negative electrode active material shown in FIG. 1D.

Referring now to FIG. 2, once the active material precursor 11 is obtained, the examples of the active material 10, 10', 10'', 10''', 10'''' may be formed therefrom. Different examples (labeled as "1", "2", "3", and "4" in FIG. 2) of forming different active materials 10, 10', 10'', 10''', 10'''' are shown. It is to be understood that the different active materials 10, 10', 10'', 10''', 10'''' all may all be used as the active material (alone or in combination) in a negative electrode.

As shown in FIG. 2, the starting material for forming the active materials 10, 10', 10'', 10''', 10'''' is the precursor 11, which includes the $SiO_x$ coated silicon particles with voids therein (14', 22, 26) and the silicides 24.

In an example (labeled "0" in FIG. 2), the silicides 24 may be removed from the active material precursor 11 to form the active material 10''. In this example, the silicides 24 are removed without removing the SiO$_x$ coating 22. When voids 26 are formed using the Kirkendall effect, it may not be desirable to perform additional steps to remove the SiO$_x$ coating 22. The SiO$_x$ coating 22 may serve as an active material in the negative electrode that is ultimately formed.

The silicides 24 may be removed without removing the SiO$_x$ coating 22 by exposing the active material precursor 11 to an etchant that selectively removes silicides without deleteriously affecting the SiO$_x$ coating 22. In an example, the precursor 11 is exposed to a mixture of hydrogen peroxide ($H_2O_2$) and acetic acid ($CH_3COOH$). The $H_2O_2$ oxidizes the silicides 24 to form metal cations, and the metal cations are chelated with $CH_3COOH$ to form water soluble metal complexes. These metal complexes stay in the aqueous solution, and the solid active material 10''' can be removed from the aqueous solution. As shown in scheme 0, the silicides 24 are removed, and the active material 10''' is formed including the silicon particle 14' having voids 26 formed therein and the SiO$_x$ coating 22.

In another example (labeled "1" in FIG. 2), the silicides 24 and the SiO$_x$ coating 22 may be removed simultaneously from the active material precursor 11 to form the active material 10. Some examples of removing the silicides 24 and the SiO$_x$ coating 22 include leaching or etching. The leaching or etching may be accomplished by exposing the active material precursor 11 to an etchant that will remove the silicides 24 and the coating 22 without deleteriously affecting the underlying silicon particle 14' (in this case also active material 10). The etchant selected will depend upon the specific transition metal precursor 12 that is used. In an example when titanium or chromium transition metal precursors 12 are used, the etchant may include a mixture of hydrogen fluoride (hydrofluoric acid, HF), hydrogen peroxide ($H_2O_2$), and acetic acid ($CH_3COOH$).

In a specific example, the active material precursor 11 may be added to a solution of HF, $H_2O_2$, and $CH_3COOH$ with continuous stirring for about 3 hours in order to accomplish coating 22 removal. In this example, the ratio of hydrogen fluoride to hydrogen peroxide to acetic acid may be 1:2:3 respectively to form a 1M solution. As noted above, the $H_2O_2$ oxidizes the silicides 24 to form metal cations, and the metal cations are chelated with $CH_3COOH$ to form water soluble metal complexes (which stay in the aqueous solution). The HF reacts with the SiO$_x$ coating 22 to form water and water soluble silicon fluoride (e.g., $SiO_2+6HF=H_2SiF_6$ (water soluble)$+2H_2O$), which also stays in the aqueous solution. The solid active material 10 can be removed from the aqueous solution (e.g., via filtering).

Once the active material 10 is formed, the active material 10 may be subjected to washing and drying. The active material 10 includes the silicon particles 14' having the voids 26 formed therein and/or thereon.

In another example (labeled as "2" in FIG. 2), the silicides 24 may be removed as described in scheme 0 (without removing the SiO$_x$ coating 22), and then a carbon coating layer 28 may be formed on the SiO$_x$ coating 22 to form the active material 10'. The carbon coating layer 28 may be formed of a substantially amorphous carbon.

In an example, the carbon coating layer 28 may be formed on the SiO$_x$ coating 22 using chemical vapor deposition (CVD) or a polyol method. In an example of the CVD method using a typical CVD apparatus, toluene ($C_6H_5CH_3$) is heated into vapor, which serves as a carbon source. The vapor then flows through the gas deposition zone in a furnace where the sample (e.g., SiO$_x$ coated silicon particles) is located. The gas deposition zone may be maintained at a temperature ranging from about 550° C. to about 650° C. for a time ranging from about 8 hours to about 16 hours to allow vapor deposition and carbonization. At the end of the CVD process, the carbon coating layer 28 is formed on the SiO$_x$ coating 22. The thickness of the carbon coating layer 28 is dependent on the heating temperature and time.

In an example of the polyol method, polystyrene (used as a carbon precursor) is suspended in dimethylformamide (DMF) and absorbed onto the SiO$_x$ coating 22. Carbonization of the polystyrene coating takes place by heating the suspension to about 700° C. for about 30 minutes under $H_2$ formation gas. After carbonization, the carbon coating layer 28 as well as the active material 10' are formed. Finally, the product is washed by a deionized water and ethanol mixture, and dried overnight under vacuum oven at about 120° C. The active material 10' includes the silicon particles 14' with voids 26 therein and/or thereon, the SiO$_x$ coating 22, and the carbon coating layer 28.

In yet another example (labeled as "3" in FIG. 2), the same active material 10' may be formed from the active material precursor 11 as previously disclosed herein (i.e., silicide 24 removal and then carbon coating 28 formation). However in this example, the active material 10' may undergo an additional step to remove the SiO$_x$ coating 22 to form the active material 10''. The SiO$_x$ coating 22 may be removed by exposing the active material 10' to HF. The removal of the SiO$_x$ coating 22 forms a gap 30 (i.e., a void space) between the silicon particle 14' and the carbon coating layer 28, which forms the active material 10''. As illustrated in FIG. 2, once the gap 30 is formed, the silicon particle 14' may partially contact the carbon coating 28. In addition to the voids 26, the gap 30 may further accommodate the volume expansion of the silicon 14' during cycling of the battery in which it is used.

After formation of the active material 10'', it may be subjected to washing, and drying as previously disclosed herein. The active material 10'' includes the silicon particles 14' with voids 26, the carbon coating layer 28, and the gap 30 formed between the silicon particle 14' and the carbon coating layer 28.

In yet another example (labeled as "4" in FIG. 2), the same active material 10 may be formed from the active material precursor 11 as previously disclosed herein. After the silicides 24 and the SiO$_x$ coating 22 have been removed, the carbon coating 28 may then be formed directly on the active material 10 using the CVD or polyol methods previously described. This active material is shown as reference numeral 10''''.

After formation of the active material 10'''', it may be subjected to washing and drying as previously disclosed herein. The active material 10' includes the silicon particles 14' with voids 26 and the carbon coating layer 28 formed directly on the silicon particles 14'.

It is to be understood that the carbon coating layer 28 of the active material 10', 10'', 10'''', regardless of the presence of the SiO$_x$ coating 22 in the active material 10', increases the electrical conductivity, thereby increasing the cycling performance. The cycling performance may also increase due, in part, to the carbon coating layer 28 increasing the mechanical strength of the active materials 10', 10'', 10''''. The mechanical strength may be improved because the carbon coating layer 28 contributes to reduced fracturing, decrepitating, and other mechanical degradation of the active material 10', 10'', 10''''.

Referring now to FIGS. 3A-3D, another example of the method for forming other examples of the negative electrode active material is depicted. In FIG. 3A, a transition metal precursor 12' is selected that includes a transition metal that has a diffusion rate that is faster than the diffusion rate of silicon. As such, when exposed to certain condition(s), the silicon atoms will diffuse slower than the selected transition metal atoms. In this instance, any reactions involving the silicon atoms take place inside the silicon particle 14. More particularly, this causes silicides 24 (shown in FIG. 3D) to form inside the silicon particle 14.

The transition metal precursor 12' may be a compound of the transition metal and a suitable anion. In an example, the transition metal precursor 12' is water soluble. In this example of the method, suitable transition metals, which have a diffusion rate that is faster than the diffusion rate of silicon, consist of iron, cobalt, nickel, copper, and vanadium. Examples of suitable anions include nitrate ions ($NO_3^-$), chloride ions ($Cl^-$) sulfate ions ($SO_4$), acetate ions ($CH_3COO$), etc.

In the example shown in FIG. 3A, the transition metal precursor 12' may be introduced into a container 18 with silicon particles 14 and an aqueous medium 13' capable of dissolving the transition metal precursor 12' and of having the silicon particles 14 dispersed therein, as previously disclosed herein for FIG. 1A. In addition, the same aqueous media 13' disclosed herein with respect to FIG. 1A, such as water or water in combination with a solvent that is at least miscible in water, may be used.

In an example, the transition metal precursor 12' may be added to the aqueous medium 13' in the container 18 to form an aqueous solution. The precursor 12' and aqueous medium 13' may be stirred until the transition metal precursor 12' is completely dissolved. Mixing may be accomplished (e.g., using a magnetic stir bar, ultrasonic vibration, etc.) for any suitable time to dissolve the transition metal precursor 12'. In an example, the mixing time ranges from about 10 minutes to about 30 minutes. After mixing and dissolution of the transition metal precursor 12', the aqueous solution may be homogeneous. The dissolved transition metal precursor 12' is represented by the speckles in the aqueous medium 13' in FIG. 3A.

In this example, once the transition metal precursor 12' is fully dissolved to form the aqueous solution, the silicon particles 14 may be added to the aqueous solution to form the aqueous mixture 16' shown in FIG. 3A (which includes the transition metal precursor 12' dissolved in the aqueous medium 13' and the silicon particles 14 dispersed in the aqueous medium 13'). Mixing may be accomplished by stirring the components until the silicon particles 14 are evenly dispersed throughout aqueous solution to form the aqueous mixture 16'. The components may be mixed using a magnetic stir bar for a time ranging from about 10 minutes to about 30 minutes in order to fully disperse the silicon particles 14 and form the aqueous mixture 16'. Mixing may be performed in any other desirable manner, e.g., manually or other mechanical stirring mechanism.

In another example, the transition metal precursor 12' and the silicon particles 14 may be added to the aqueous medium 13' simultaneously in the container 18 to form an aqueous mixture 16'. When the transition metal precursor 12' and the silicon particles 14 are added, the aqueous medium 13 is stirred until the precursor 12' dissolves, the silicon particles 14 are dispersed, and the mixture 16' is formed. In still another example, the silicon particles 14 may be added to the aqueous medium 13' in the container 18 to form an aqueous dispersion. In this example, the transition metal precursor 12' may be added to the aqueous dispersion (and stirred) to form the aqueous mixture 16'.

Throughout the methods, appropriate amounts of the solvent (e.g., isopropyl alcohol, methanol, ethanol, acetone, etc.) may be added in order to reduce the water surface tension so that the silicon particles 14 can be readily wetted.

In one specific example, the aqueous mixture 16' is formed by weighing out a desired amount (e.g., 1.0583 g) of $CoCl_2 \cdot 6H_2O$ as the transition metal precursor 12', and adding the precursor 12' to about 200 mL of deionized water. The precursor 12' and water are stirred for about 10 minutes, until the $CoCl_2 \cdot 6H_2O$ is completely dissolved. About 1 g of the silicon particles 14 is added to the aqueous solution, and stirred until the mixture 16' is formed. The amounts of each of the precursor 12', the silicon particles 14, and the aqueous medium may be varied, but are generally included so that up to 25% of total silicon is converted into a silicide.

In this example of the method, the same types, sizes, and compositions of silicon particles 14 may be used as previously described herein in reference to the method of FIGS. 1A-1D.

Referring to FIG. 3B, the aqueous mixture 16' including the dispersed silicon particle 14 and the dissolved transition metal precursor 12', is exposed to a hydroxide 15 to form a product 19", which includes the silicon particles 14 and a transition metal hydroxide precipitate 20'. Some suitable hydroxides 15, for example, include sodium hydroxide (NaOH), ammonium hydroxide ($NH_4OH$), calcium hydroxide ($Ca(OH)_2$), or potassium hydroxide (KOH). In this example of the method, the amount of hydroxide 15 that is added will depend upon the amount of transition metal precursor 12' in the aqueous mixture 16'. In general, the hydroxide 15 amount is sufficient to precipitate out transition metal hydroxide. In an example, the molar amount of the hydroxide 15 that is added is about 2.5 times the molar amount of the transition metal precursor 12' present in the aqueous mixture 16'.

The hydroxide 15 added to the aqueous mixture 16' reacts with the dissolved transition metal precursor 12' to form the transition metal hydroxide precipitate 20'. As such, the transition metal hydroxide precipitate 20' that is formed depends upon the transition metal in the precursor 12'. Transition metal hydroxide precipitates 20' may include, for example, iron(II) hydroxide or iron(III) hydroxide ($Fe(OH)_2$ or $Fe(OH)_3$, respectively), cobalt(II) hydroxide ($Co(OH)_2$), nickel hydroxide ($Ni(OH)_2$), or vanadium(II) hydroxide or vanadium(V) hydroxide ($V(OH)_2$ or $V(OH)_4$, respectively).

The transition metal hydroxide precipitate 20' precipitates out of mixture 16'. In an example, the transition metal hydroxide precipitate 20' may be uniformly mixed with the silicon particles 14. As shown in FIG. 3B, the transition metal hydroxide precipitates 20' may precipitate onto the surface of the silicon particles 14 to form aggregate particles, which are an example of the product 19". The transition metal hydroxide precipitates 20' may also or alternatively be in contact with and/or adjacent to the silicon particles 14.

The formation of the product 19" enables the precipitate 20' and the silicon particles 14 to be isolated from the aqueous medium 13' of the mixture 16' before forming the negative electrode active material. Product 19" isolation also separates out any undesirable cations from the base and/or anions from the transition metal precursor 12' that remain in the aqueous medium after the precipitation take place. In turn, this prevents the formation of any undesirable products in the negative electrode active material.

Referring now to FIG. 3C, the product 19" (e.g., aggregates or mixtures of the silicon particles 14 and the precipitates 20' shown in FIG. 3B) that is formed is filtered, washed, and dried to form the dried product 19''', which is a solid mixture of the silicon particles 14 and the transition metal hydroxide precipitate 20'. It is to be understood that filtering, washing, and drying may be accomplished via any suitable techniques, such as those previously disclosed herein in reference to FIG. 1C.

Turning now to FIG. 3D, the dried product 19''' is then placed into an inert or reducing environment and heated to temperature ranging from about 800° C. to about 1100° C. The heat is applied for a time ranging from about 4 hours to about 8 hours.

The temperature drives a redox reaction between the transition metal hydroxide precursor 20' and silicon atoms at the surface of the silicon particles 14. In an example, during the redox reaction, the transition metal hydroxide precursor 20' is reduced to the transition metal (e.g., metallic copper, metallic iron, metallic cobalt, metallic nickel, metallic vanadium etc.), and hydroxide ions or $H_2O$. During the redox reaction, the hydroxide ions react with silicon atoms at the surface of the silicon particles 14 to form a $SiO_x$ (where $0<x\leq2$) coating 22 on the silicon particles 14. In an example, the $SiO_x$ coating 22 is silicon monoxide, silicon dioxide, or silicon suboxide.

The temperature also drives the diffusion of the transition metal atoms into the silicon particles 14. The heat initiated diffusion rate of the silicon atoms is slower than the diffusion rate of the transition metal atoms. As such, the transition metal atoms diffuse into the silicon particles 14 before silicon atoms diffuse out of the silicon particles 14. The transition metal atoms diffuse into the silicon particles 14 and react with the silicon atoms. As a result of this reaction, silicides 24 are formed within the silicon particles 14. These particles are referred to as silicon particles having silicides 24 therein (shown as 14").

It is to be understood that the amount and size of the silicides 24 within the silicon particles 14" can be controlled by the amount of transition metal precursor 12' used in the aqueous mixture 16', in combination with the amount of time the dried product 19''' is subjected to heating. A longer heating time allows more transition metal atoms to diffuse into the silicon particles 14. In addition, the amount of transition metal precursor 12' used to form the silicon particles 14", in combination with the temperature for heating, may also be used to control the size of the silicides 24 within the silicon particles 14". A higher heating temperature causes more transition metal atoms to diffuse into the silicon particles 14, and more precursor 12' at the outset of the method provides more atoms available for diffusion. During heating of the dried product 19''', if the temperature and/or time is increased, in combination with a sufficient amount of transition metal precursor 12', the size of the silicides 24 are also increased. Smaller sized silicides 24 may be created by a shorter exposure time to heat, a lower temperature, and/or a smaller amount of transition metal precursor 12' used to form the silicon particle 14".

As mentioned above, heating may take place in an inert environment or a reducing environment as previously disclosed herein for FIG. 1D. When a reducing environment is used, $H_2$ from the reducing environment may accelerate the reduction of metal ions (i.e., the reduction of the transition metal hydroxide precursor 20' to the transition metal atoms and hydroxide ions), the diffusion of metal atoms (after metal ion reduction), and the formation of the silicides 24.

Once heating is accomplished for a suitable time, an active material precursor 11' is formed.

Figure 4:
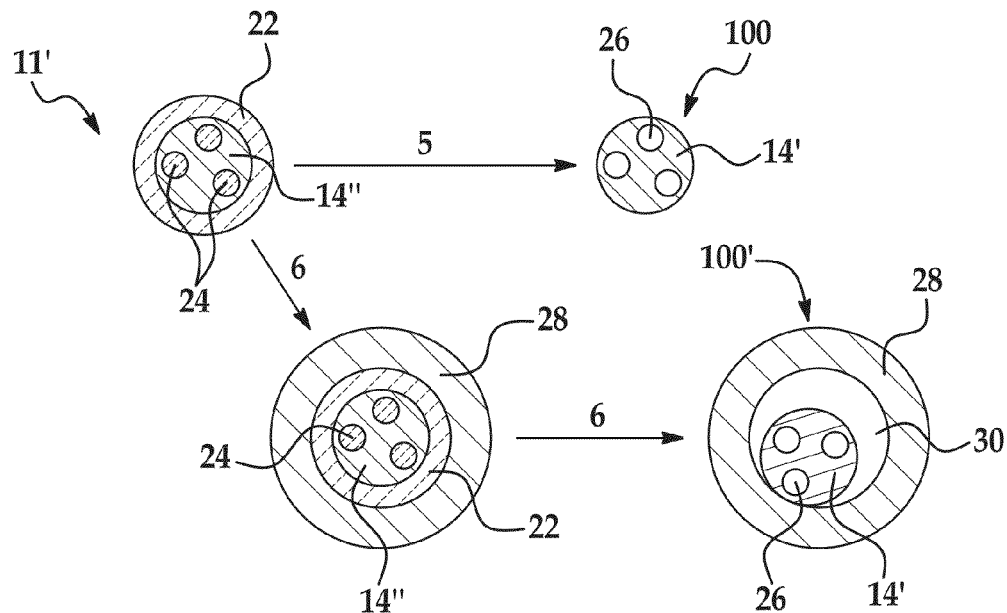
FIG. 4 is a cross-sectional view of an example of a negative electrode active material and an example of a carbon-coated negative electrode active material formed from the example of the precursor shown in FIG. 3D.

Referring now to FIG. 4, once the active material precursor 11' is obtained, the active material 100, 100' may be formed therefrom. Different examples (labeled as "5" and "6" in FIG. 4) of forming different active materials 100, 100' are shown. It is to be understood that the different active materials 100, 100' may all be used as the active material in a negative electrode. The active material 100 is similar to the active material 10. The voids 26 may be formed in the interior of the silicon particle 14" and/or closer to and/or at the surface of the silicon particle 14". Similarly, the active material 100' is similar to the active material 10". The voids 26 may be formed in the interior of the silicon particle 14" and/or closer to and/or at the surface of the silicon particle 14".

In an example (labeled "5" in FIG. 4), the $SiO_x$ coating 22 and the silicides 24 may be removed from the active material precursor 11' to form the active material 100. An example of removing the $SiO_x$ coating 22 and the silicides 24 includes converting the silicides 24 to oxides (e.g., metal oxide and $SiO_x$), and then leaching or etching the $SiO_x$ coating 22 and the oxides (converted from the silicides 24) simultaneously from the silicon particle 14".

The leaching or etching may be accomplished by exposing the active material precursor 11' to an etchant that will remove the $SiO_x$ coating 22 and/or the converted silicides 24 without deleteriously affecting the underlying silicon particle 14". The etchant selected will depend upon the specific transition metal precursor 12' that is used. In an example using a cobalt or nickel transition metal precursor 12', the etchant may be a combination of $H_2O_2$, HF, $CH_3COOH$. In another example using a cobalt transition metal precursor 12', 1M hydrochloric acid (HCl) and $H_2O_2$ ($HCl:H_2O_2$=3:1) may be used to remove $CoSi_2$. In still another example using a nickel transition metal precursor 12', 1 M nitric acid ($HNO_3$) may be used to remove NiSi. The $HNO_3$ may be coupled with sodium citrate ($Na_3(C_6H_5O_7)$) for ligand complexing. Any of these etchants may also be coupled with HF for $SiO_x$ coating 22 removal.

In a specific example, the active material precursor 11' may be added to a solution of hydrogen peroxide ($H_2O_2$), hydrogen fluoride (hydrofluoric acid, HF), and acetic acid ($CH_3COOH$) with continuous stirring, for example, for about 3 hours. The volume ratio of hydrogen fluoride to hydrogen peroxide to acetic acid may be 1:2:3, in a 1M solution. The $H_2O_2$ oxidizes the silicides 24 to form metal cations, which are chelated with $CH_3COOH$ to form water soluble metal complexes that stay in the aqueous solution. The HF reacts with the $SiO_x$ coating 22 to form water and water soluble silicon fluoride (e.g., $SiO_2+6HF=H_2SiF_6$ (water soluble)+$2H_2O$), which also stays in the aqueous solution.

In another example of removing the silicides 24, the etchant selected may be a solution of nitric acid ($HNO_3$) (for acid leaching), water, and sodium citrate ($Na_3(C_6H_5O_7)$) (for ligand complexing). The ratio of the nitric acid to water to sodium citrate may be 1:2:3. The active material precursor 11' may be added to this solution with continuous stirring for about 3 hours.

Once the active material 100 is formed, the active material 100 may be separated from any liquid, and subjected to washing and drying as previously disclosed herein. The active material 100 includes the silicon particles 14' having the voids 26 formed therein and/or thereon. It is to be understood that the voids 26 in this example are the spaces previously occupied by the silicides 24.

In another example (labeled as "6" in FIG. 4), a carbon coating layer 28 may be formed on the $SiO_x$ coating 22 to form the active material precursor 11' with the carbon coating 28. The carbon coating layer 28 may be formed of the same material and by the same method as previously disclosed herein for FIG. 2, schemes 2 or 3 or 4 (e.g., by adding substantially amorphous carbon via chemical vapor deposition or the polyol method).

After the carbon coating layer 28 is formed on the $SiO_x$ coating 22, the $SiO_x$ coating 22 is removed and the silicides 24 are oxidized to form cations, which react (e.g., with CH₃COOH or Na₃(C₆H₅O₇)) to form metal complexes that are removed to form the active material 100'. The SiO$_x$ coating 22 and silicides 24 may be removed as described herein for scheme 5 in FIG. 4 (e.g., via silicide oxidation, following by chelating and chemical etching). The removal of the silicides 24 forms the voids 26 in the silicon particle 14', and the removal of the SiO$_x$ coating 22 forms a gap 30 between the silicon particle 14' and the carbon coating layer 28. The structure including the silicon particle 14' with voids 26, the gap 30, and the carbon coating layer 28 forms the active material 100'. The gap 30 and voids 26 may advantageously accommodate the volume expansion of the silicon 14' during cycling of the battery in which it is used.

After formation of the active material 100', it may be separated from any remaining liquid and subjected to washing and drying as previously disclosed herein. The active material 100' includes the silicon particles 14' with voids 26, the carbon coating layer 28, and the gap 30 formed between at least part of the silicon particle 14' and the carbon coating layer 28.

Figure 5:
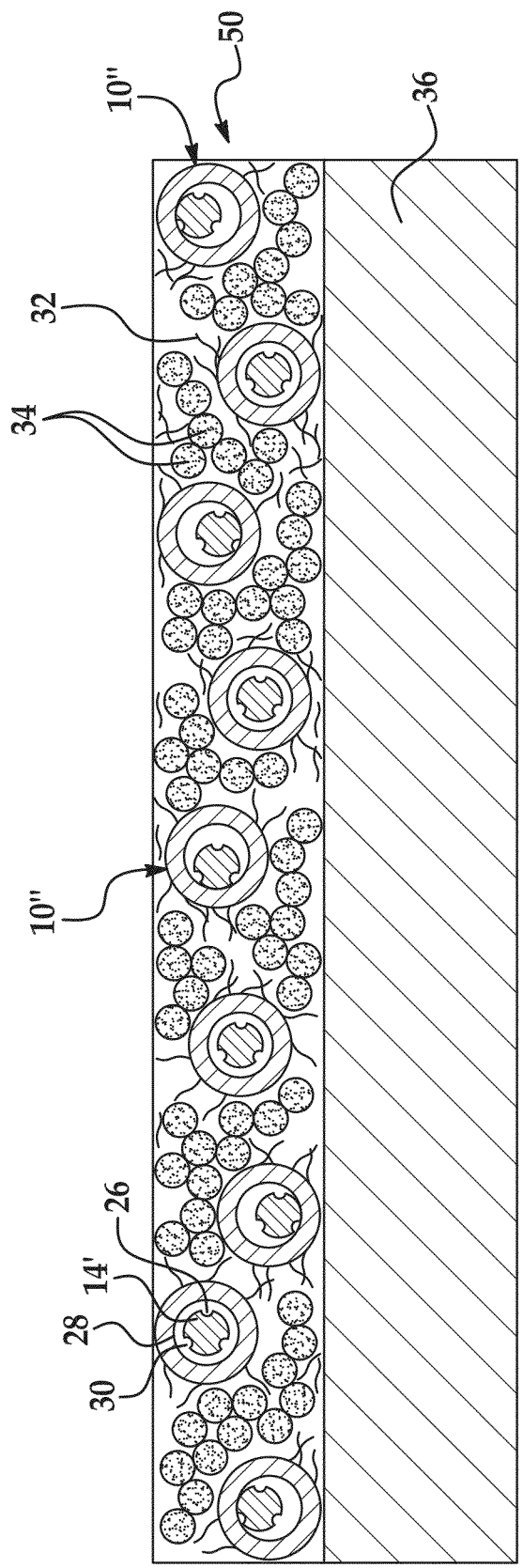
FIG. 5 is a cross-sectional view of an example of a negative electrode on a current collector.

An example of the method for preparing the negative electrode 50 will now be discussed in reference to FIG. 5. It is to be understood that the active materials 10, 10', 10", 10''', 10'''', 100, 100' formed from the methods disclosed herein, may each be used individually, or in combination, as the active material in the negative electrode 50. FIG. 5 depicts an example of the negative electrode 50 including the active material 10", a binder 32, and a conductive filler 34 on a support 36.

In examples of preparing the negative electrode 50, the active material 10, 10', 10", 10''', 10'''', 100, 100" is mixed with other negative electrode components to form a dispersion or slurry. Examples of the other negative electrode components may include the binder 32 and the conductive filler 34.

In an example of preparing the dispersion or slurry, the binder 32 is mixed into a solvent to form a solution. Examples of the binder 32 may be made of at least one of polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders.

Suitable examples of the solvent that may be mixed with the binder 32 to form the solution may include a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

The conductive filler 34 may also be added to the solution including the binder 32 and the solvent. The conductive filler 34 may be a high surface area carbon, such as acetylene black (i.e., carbon black). Other examples of suitable conductive fillers, which may be used alone or in combination with carbon black, include graphene, graphite, carbon nanotubes, and/or carbon nanofibers. One specific example of a combination of conductive fillers is carbon black and carbon nanofibers. The conductive filler 34 is included to ensure electron conduction between a negative-side current collector (i.e., support 36) and the active material 10, 10', 10", 10''', 100, 100'.

Once the active material 10, 10', 10", 10''', 10'''', 100, 100' is added to the solution to form a dispersion or slurry, the dispersion/slurry may include the solvent, the binder 32, the active material(s) 10, 10', 10", 10''', 10'''', 100, 100', and the conductive filler 34. The amount of solvent that is included in the dispersion/slurry will depend upon the concentration of the binder 32 in the solution and the amount of binder solution used in the slurry. In one example of the dispersion/slurry, the amount of the active material 10, 10', 10", 10''', 100, 100' ranges from about 50 wt % to about 90 wt % (based on total solid wt % of the dispersion/slurry), the amount of the conductive filler 34 ranges from about 5 wt % to about 25 wt % (based on total solid wt % of the dispersion/slurry), and the amount of the binder 32 ranges from about 5 wt % to about 25 wt % (based on total solid wt % of the dispersion/slurry). Some specific examples weight ratios of active material:binder:filler include 50:25:25, 60:20:20, 70:15:15, 75:12.5:12.5, 80:10:10, and 90:5:5. While each of the binder and filler is present in the same amount in these examples, it is to be understood that the amounts of these two components may vary.

After all the components are added to form the dispersion/slurry, the dispersion may be mixed manually or by milling. Milling aids in transforming the dispersion/slurry into a coatable mixture. Low-shear milling or high-shear milling may be used to mix the dispersion/slurry. The dispersion/slurry milling time ranges from about 10 minutes to about 3 hours depending on the milling shear rate. In an example, a planetary mixer is used for about 30 minutes to mill the dispersion/slurry.

The dispersion is then deposited onto a support 36. In an example, the support 36 is a negative-side current collector. It is to be understood that the support 36 may be formed from copper or any other appropriate electrically conductive material known to skilled artisans. The support 36 that is selected should be capable of collecting and moving free electrons to and from an external circuit connected thereto.

The dispersion may be deposited using any suitable technique. As examples, the dispersion may be cast on the surface of the support 36, or may be spread on the surface of the support 36, or may be coated on the surface of the support 36 using a slot die coater.

The deposited dispersion may be exposed to a drying process in order to remove any remaining solvent. Drying may be accomplished using any suitable technique. Drying may be performed at an elevated temperature ranging from about 60° C. to about 150° C. In some examples, vacuum may also be used to accelerate the drying process. As one example of the drying process, the deposited dispersion may be exposed to vacuum at about 120° C. for about 12 to 24 hours.

The drying process results in a coating formed on the surface of the support 36. In an example, the thickness of the dried slurry (i.e., coating) ranges from about 5 μm to about 100 μm. Drying removes the solvent, and thus the weight percentages of the solids previously provided for the slurry/dispersion is the same for the final negative electrode 50.

In some examples, the negative electrode 50 may be paired with a lithium electrode. In an example, the negative electrode 50 including the active material 10, 10', 10", 10''', 10'''', 100, 100' may be paired with lithium metal to form a half-cell.

Prior to being used in the lithium ion battery 60 (FIG. 6) or the lithium-sulfur battery 70 (FIG. 7), the examples of the negative electrode 50 disclosed herein may be pre-lithiated. Pre-lithiation may be particularly desirable when the negative electrode is to be used in the lithium-sulfur battery 70. In some examples, pre-lithiation may be accomplished using any suitable electrochemical technique with a Li-Si half cell.

Figure 6:
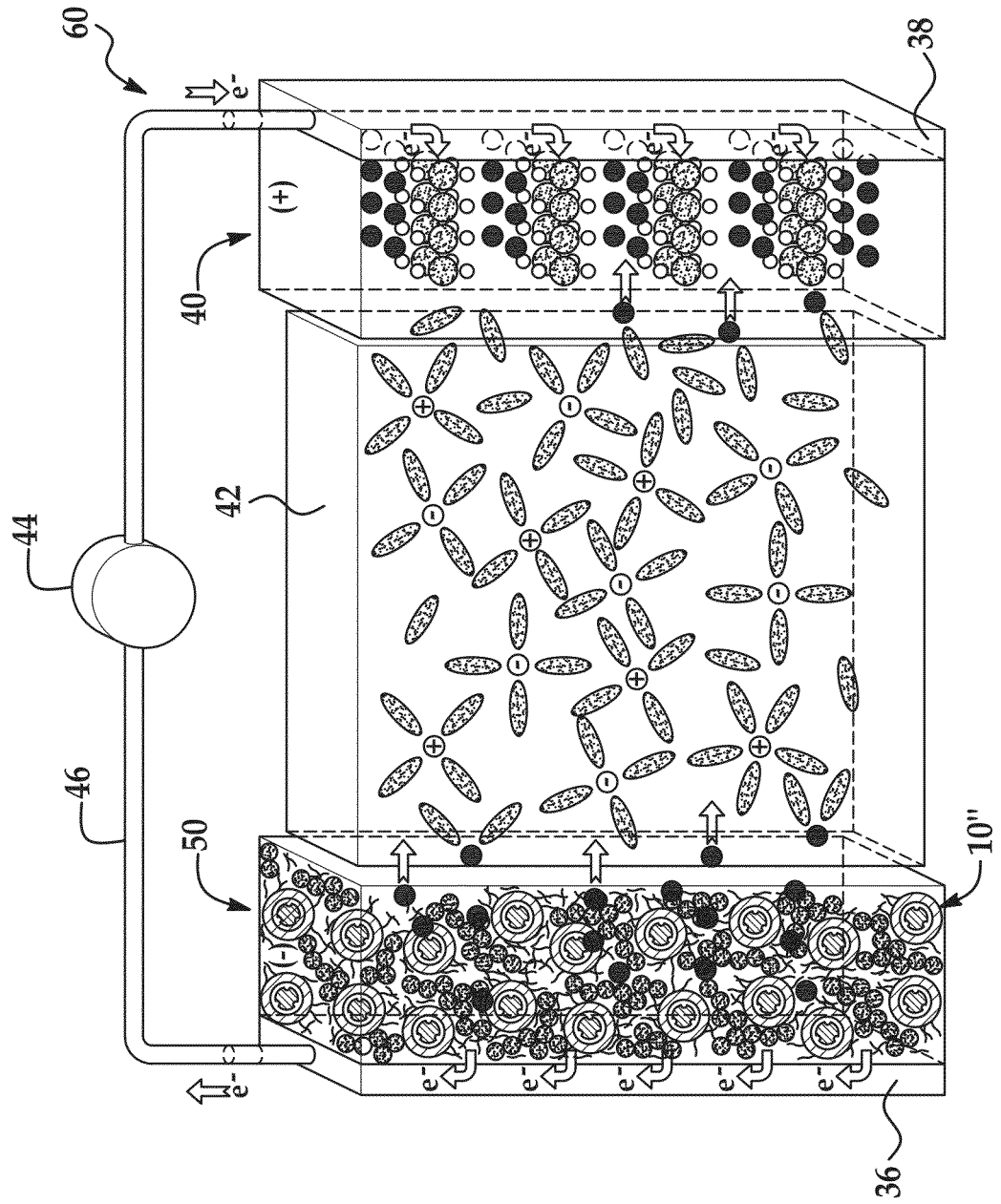
FIG. 6 is a perspective schematic view of an example of a lithium ion battery, including an example of the negative electrode active material disclosed herein.
Figure 7:
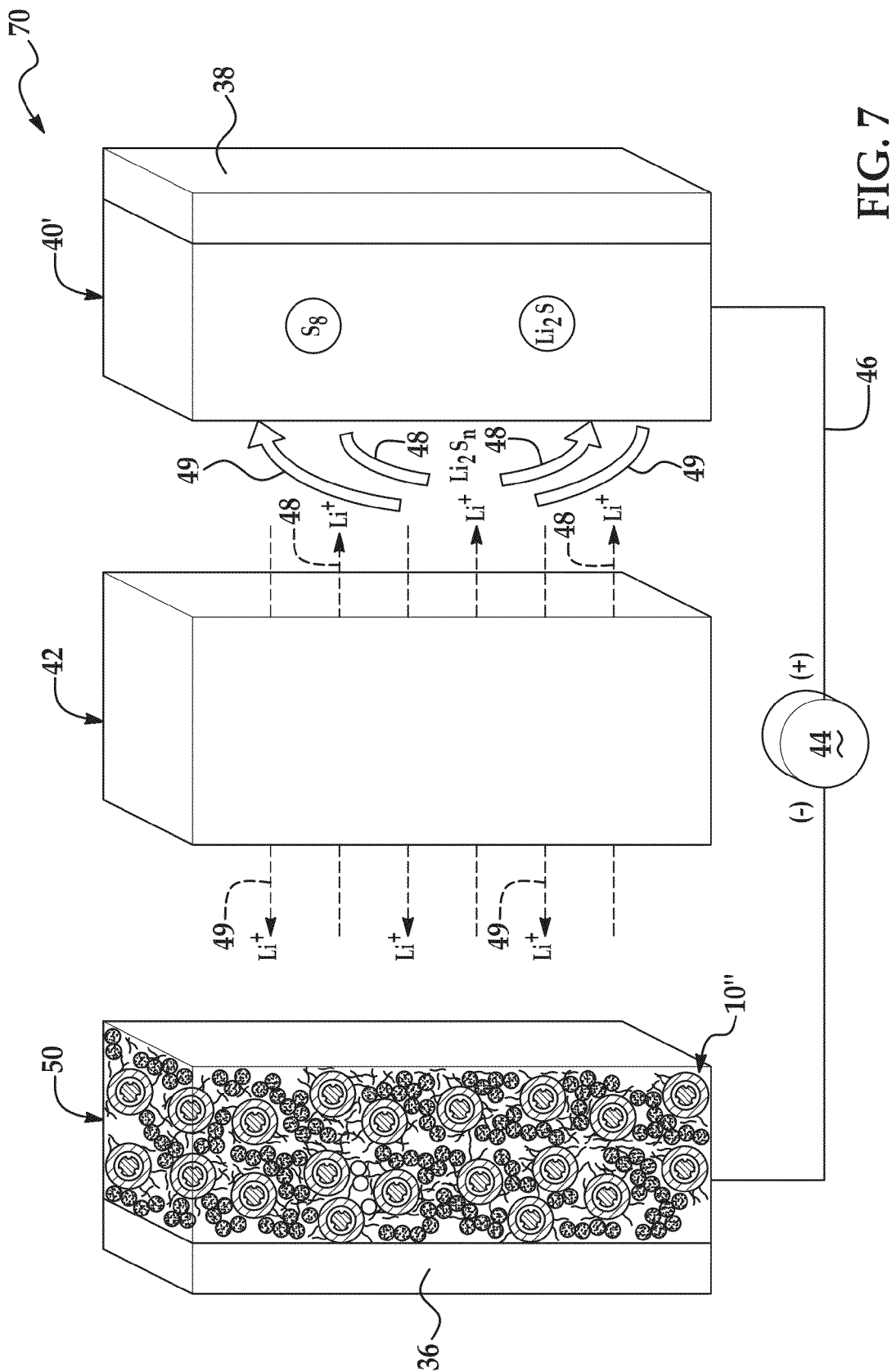
FIG. 7 is a perspective schematic view of an example of a lithium-sulfur battery, including an example of the negative electrode active material disclosed herein.

When pre-lithiation is complete, the lithiated negative electrode may be rinsed to remove any remaining pre-lithiation electrolyte, and then may be used in either the lithium ion battery 60 (FIG. 6) or the silicon-sulfur battery 70 (FIG. 7).

The active materials 10, 10', 10'', 10''', 10'''', 100, 100' of the negative electrode 50 can sufficiently undergo lithium insertion and deinsertion. As such, the negative electrode 50 formed on the support 36 (negative-side current collector) may be used in a lithium ion battery 60. An example of the lithium ion battery 60 is shown in FIG. 6.

The lithium ion battery 60 shown in FIG. 6 includes the negative electrode 50 with the active material 10''. It is to be understood that any of the active material 10, 10', 10'', 10''', 10'''', 100, 100' may be used individually, or in combination, in the negative electrode 50 of the lithium ion battery 60.

As shown in FIG. 6, the lithium ion battery 60 includes, in addition to the negative electrode 50 and the negative side current collector 36, a positive electrode 40, a positive-side current collector 38, and a porous separator 42 positioned between the negative electrode 50 and the positive electrode 40.

In FIG. 6, the positive electrode 40 may be formed from any lithium-based active material that can sufficiently undergo lithium insertion and deinsertion while aluminum or another suitable current collector is functioning as the positive terminal of the lithium ion battery 60. One common class of known lithium-based active materials suitable for the positive electrode 40 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel $[Li(Ni_{0.5}Mn_{1.5})O_2]$, a layered nickel-manganese-cobalt oxide $[Li(Ni_xMn_yCo_z)O_2$ or $Li(Ni_xMn_yCo_z)O_4$, or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), aluminum stabilized lithium manganese oxide spinel ($Li_xMn_2Al_yO_4$), lithium vanadium oxide ($LiV_2O_5$), $Li_2MSiO_4$ (M is composed of any ratio of Co, Fe, and/or Mn), $xLi_2MnO_{3-(1-x)}LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 40 may be intermingled with a polymeric binder and a high surface area carbon. Suitable binders include polyvinylidene fluoride (PVdF), an ethylene propylene diene monomer (EPDM) rubber, and/or carboxymethyl cellulose (CMC)). The polymeric binder structurally holds the lithium-based active materials and the high surface area carbon together. An example of the high surface area carbon is acetylene black. The high surface area carbon ensures electron conduction between the positive-side current collector 38 and the active material particles of the positive electrode 40.

The positive-side current collector 38 may be formed from aluminum or any other appropriate electrically conductive material known to skilled artisans.

The porous separator 42 in FIG. 6, which operates as both an electrical insulator and a mechanical support, is sandwiched between the negative electrode 50 and the positive electrode 40 to prevent physical contact between the two electrodes 50, 40 and the occurrence of a short circuit. In addition to providing a physical barrier between the two electrodes 50, 40, the porous separator 42 ensures passage of lithium ions (identified by the black dots and by the open circles having a (+) charge in FIG. 6) and related anions (identified by the open circles having a (−) charge in FIG. 6) through an electrolyte solution filling its pores. This helps ensure that the lithium ion battery 60 functions properly.

The porous separator 42 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 42 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 42 may be chosen from a combination of the polyolefin (such as PE and/or PP) and one or more of the polymers listed above.

The porous separator 42 may contain a single layer or a multi-layer laminate fabricated from either a dry or wet process. For example, a single layer of the polyolefin and/or other listed polymer may constitute the entirety of the porous separator 42. As another example, however, multiple discrete layers of similar or dissimilar polyolefins and/or polymers may be assembled into the porous separator 42. In one example, a discrete layer of one or more of the polymers may be coated on a discrete layer of the polyolefin to form the porous separator 42. Further, the polyolefin (and/or other polymer) layer, and any other optional polymer layers, may further be included in the porous separator 42 as a fibrous layer to help provide the porous separator 42 with appropriate structural and porosity characteristics. Still other suitable porous separators 42 include those that have a ceramic layer attached thereto, and those that have ceramic filler in the polymer matrix (i.e., an organic-inorganic composite matrix).

Any appropriate electrolyte solution that can conduct lithium ions between the negative electrode 50 and the positive electrode 40 may be used in the lithium ion battery 60. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 60 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(FSO_2)_2$, $LiN(CF_3SO_2)_2$, $LiAsF_6$, $LiPF_6$, LITFSI, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof.

As shown in FIG. 6, the lithium ion battery 60 also includes an interruptible external circuit 46 that connects the negative electrode 50 and the positive electrode 40. The lithium ion battery 60 may also support a load device 44 that can be operatively connected to the external circuit 46. The load device 44 receives a feed of electrical energy from the electric current passing through the external circuit 46 when the lithium ion battery 60 is discharging. While the load device 44 may be any number of known electrically-powered devices, a few specific examples of a power-consuming load device 44 include an electric motor for a hybrid vehicle or an all-electrical vehicle, a laptop computer, a cellular phone, and a cordless power tool. The load device 44 may also, however, be an electrical power-generating apparatus that charges the lithium ion battery 60 for purposes of storing energy. For instance, the tendency of windmills and solar panels to variably and/or intermittently generate electricity often results in a need to store surplus energy for later use.

The lithium ion battery 60 may also include a wide range of other components that, while not depicted here, are nonetheless known to skilled artisans. For instance, the lithium ion battery 60 may include a casing, gaskets, terminals, tabs, and any other desirable components or materials that may be situated between or around the negative electrode 50 and the positive electrode 40 for performance-related or other practical purposes. Moreover, the size and shape of the lithium ion battery 60, as well as the design and chemical make-up of its main components, may vary depending on the particular application for which it is designed. Battery-powered automobiles and hand-held consumer electronic devices, for example, are two instances where the lithium ion battery 60 would most likely be designed to different size, capacity, and power-output specifications. The lithium ion battery 60 may also be connected in series and/or in parallel with other similar lithium ion batteries to produce a greater voltage output and current (if arranged in parallel) or voltage (if arranged in series) if the load device 44 so requires.

The lithium ion battery 60 generally operates by reversibly passing lithium ions between the negative electrode 50 and the positive electrode 40. In the fully charged state, the voltage of the battery 60 is at a maximum (typically in the range 2.0V to 5.0V); while in the fully discharged state, the voltage of the battery 60 is at a minimum (typically in the range 0V to 2.0V). Essentially, the Fermi energy levels of the active materials in the positive and negative electrodes 40, 50 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 44 enables an electronic current flow in the external circuit 46 with a direction such that the difference between the Fermi levels (and, correspondingly, the cell voltage) decreases. The reverse happens during battery charging: the battery charger forces an electronic current flow in the external circuit 46 with a direction such that the difference between the Fermi levels (and, correspondingly, the cell voltage) increases.

At the beginning of a discharge, the negative electrode 50 of the lithium ion battery 60 contains a high concentration of intercalated lithium while the positive electrode 40 is relatively depleted. When the negative electrode 50 contains a sufficiently higher relative quantity of intercalated lithium, the lithium ion battery 60 can generate a beneficial electric current by way of reversible electrochemical reactions that occur when the external circuit 46 is closed to connect the negative electrode 50 and the positive electrode 40. The establishment of the closed external circuit under such circumstances causes the extraction of intercalated lithium from the negative electrode 50. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 40 and the negative electrode 50 (ranging from about 2.0V to about 5.0V, depending on the exact chemical make-up of the electrodes 50, 40) drives the electrons ($e^-$) produced by the oxidation of intercalated lithium at the negative electrode 50 through the external circuit 46 towards the positive electrode 40. The lithium ions are concurrently carried by the electrolyte solution through the porous separator 42 towards the positive electrode 40. The electrons ($e^-$) flowing through the external circuit 46 and the lithium ions migrating across the porous separator 42 in the electrolyte solution eventually reconcile and form intercalated lithium at the positive electrode 40. The electric current passing through the external circuit 46 can be harnessed and directed through the load device 44 until the level of intercalated lithium in the negative electrode 50 falls below a workable level or the need for electrical energy ceases.

The lithium ion battery 60 may be recharged after a partial or full discharge of its available capacity. To charge the lithium ion battery 60 an external battery charger is connected to the positive and the negative electrodes 40, 50, to drive the reverse of battery discharge electrochemical reactions. During recharging, the electrons ($e^-$) flow back towards the negative electrode 50 through the external circuit 46, and the lithium ions are carried by the electrolyte across the porous separator 42 back towards the negative electrode 50. The electrons ($e^-$) and the lithium ions are reunited at the negative electrode 50, thus replenishing it with intercalated lithium for consumption during the next battery discharge cycle.

The external battery charger that may be used to charge the lithium ion battery 60 may vary depending on the size, construction, and particular end-use of the lithium ion battery 60. Some suitable external battery chargers include a battery charger plugged into an AC wall outlet and a motor vehicle alternator.

Referring now to FIG. 7, the lithium-sulfur battery 70 includes the negative electrode 50 with the active material 10" made from the methods disclosed herein. It is to be understood that each of the active material 10, 10', 10", 10''', 10'''', 100, 100' may be used individually, or in combination, in the negative electrode 50 of the lithium-sulfur battery 70.

In FIG. 7, the lithium-sulfur battery 70 contains the negative electrode 50, the negative side current collector 36, a positive electrode 40', a positive-side current collector 38, and a porous separator 42 positioned between the negative electrode 50 and the positive electrode 40'. It is to be understood that the porous separator 42 may be the same type of porous separator 42 that is used in a lithium ion battery 60 described herein. In addition, the negative current collector 36 and positive current collector 38 described herein for the lithium ion battery 60 may also be used in the lithium-sulfur battery 70.

For the lithium-sulfur battery 70, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiB(C_2O_4)_2$ (LiBOB), $LiBF_2(C_2O_4)$ (LiODFB), $LiPF_4(C_2O_4)$ (LiFOP), $LiNO_3$, $LiPF_6$, LITFSI, and mixtures thereof.

For the lithium-sulfur battery 70, the positive electrode 40' may include any sulfur-based active material that can sufficiently undergo lithium alloying and dealloying with aluminum or another suitable current collector functioning as the positive terminal of the lithium-sulfur battery 70. Examples of sulfur-based active materials include $S_8$, $Li_2S_8$, $Li_2S_6$, $Li_2S_4$, $Li_2S_2$, and $Li_2S$.

The sulfur-based active material of the positive electrode 40' may be intermingled with the polymer binder and the conductive filler. Suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, or other water-soluble binders. The polymer binder structurally holds the sulfur-based active material and the conductive filler together. An example of the conductive filler is a high surface area carbon, such as acetylene black or activated carbon. The conductive filler ensures electron conduction between the positive-side current collector 46 and the sulfur-based active material. In an example, the positive electrode active material and the polymer binder may be encapsulated with carbon.

The positive and negative electrodes 40', 50 are in contact, respectively, with current collectors 38, 36. The negative-side current collector 36 collects and moves free electrons to and from the external circuit 46. The positive-side current collector 38 collects and moves free electrons to and from the external circuit 46.

The lithium-sulfur battery 70 may support a load device 44 that can be operatively connected to the external circuit 46. The load device 44 receives a feed of electrical energy from the electric current passing through the external circuit 46 when the lithium-sulfur battery 70 is discharging. While the load device 44 may be any number of known electrically-powered devices, a few specific examples of a power-consuming load device include an electric motor for a hybrid vehicle or an all-electrical vehicle, a laptop computer, a cellular phone, and a cordless power tool. The load device 44 may also, however, be an electrical power-generating apparatus that charges the lithium-sulfur battery 70 for purposes of storing energy. For instance, the tendency of windmills and solar panels to variably and/or intermittently generate electricity often results in a need to store surplus energy for later use.

The lithium-sulfur battery 70 can include a wide range of other components that, while not depicted here, are nonetheless known to skilled artisans. For instance, the lithium-sulfur battery 70 may include a casing, gaskets, terminals, tabs, and any other desirable components or materials that may be situated between or around the negative electrode 50 and the positive electrode 40' for performance-related or other practical purposes. Moreover, the size and shape of the lithium-sulfur battery 70, as well as the design and chemical make-up of its main components, may vary depending on the particular application for which it is designed. Battery-powered automobiles and hand-held consumer electronic devices, for example, are two instances where the lithium-sulfur battery 70 would most likely be designed to different size, capacity, and power-output specifications. The lithium-sulfur battery 70 may also be connected in series and/or in parallel with other similar lithium-sulfur batteries 70 to produce a greater voltage output and current (if arranged in parallel) or voltage (if arranged in series) if the load device 44 so requires.

The lithium-sulfur battery 70 can generate a useful electric current during battery discharge (shown by reference numeral 48 in FIG. 7). During discharge, the chemical processes in the battery 70 include lithium ($Li^+$) dissolution from the surface of the negative electrode 50 and incorporation of the lithium cations into alkali metal polysulfide salts (i.e., $Li_2S$) in the positive electrode 40'. As such, polysulfides are formed (sulfur is reduced) on the surface of the positive electrode 40' in sequence while the battery 70 is discharging. The chemical potential difference between the positive electrode 40' and the negative electrode 50 (ranging from approximately 1.5 to 3.0 volts, depending on the exact chemical make-up of the electrodes 50, 40') drives electrons produced by the dissolution of lithium at the negative electrode 50 through the external circuit 46 towards the positive electrode 40'. The resulting electric current passing through the external circuit 46 can be harnessed and directed through the load device 44 until the lithium in the negative electrode 50 is depleted and the capacity of the lithium-sulfur battery 70 is diminished.

The lithium-sulfur battery 70 can be charged or re-powered at any time by applying an external power source to the lithium-sulfur battery 70 to reverse the electrochemical reactions that occur during battery discharge. During charging (shown at reference numeral 49 in FIG. 7), lithium plating to the negative electrode 50 takes place, and sulfur formation at the positive electrode 40' takes place. The connection of an external power source to the lithium-sulfur battery 70 compels the otherwise non-spontaneous oxidation of lithium at the positive electrode 40' to produce electrons and lithium ions. The electrons, which flow back towards the negative electrode 50 through the external circuit 46, and the lithium ions ($Li^+$), which are carried by the electrolyte across the porous membrane 42 back towards the negative electrode 50, reunite at the negative electrode 50 and replenish it with lithium for consumption during the next battery discharge cycle. The external power source that may be used to charge the lithium-sulfur battery 70 may vary depending on the size, construction, and particular end-use of the lithium-sulfur battery 70. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Figure 8A:
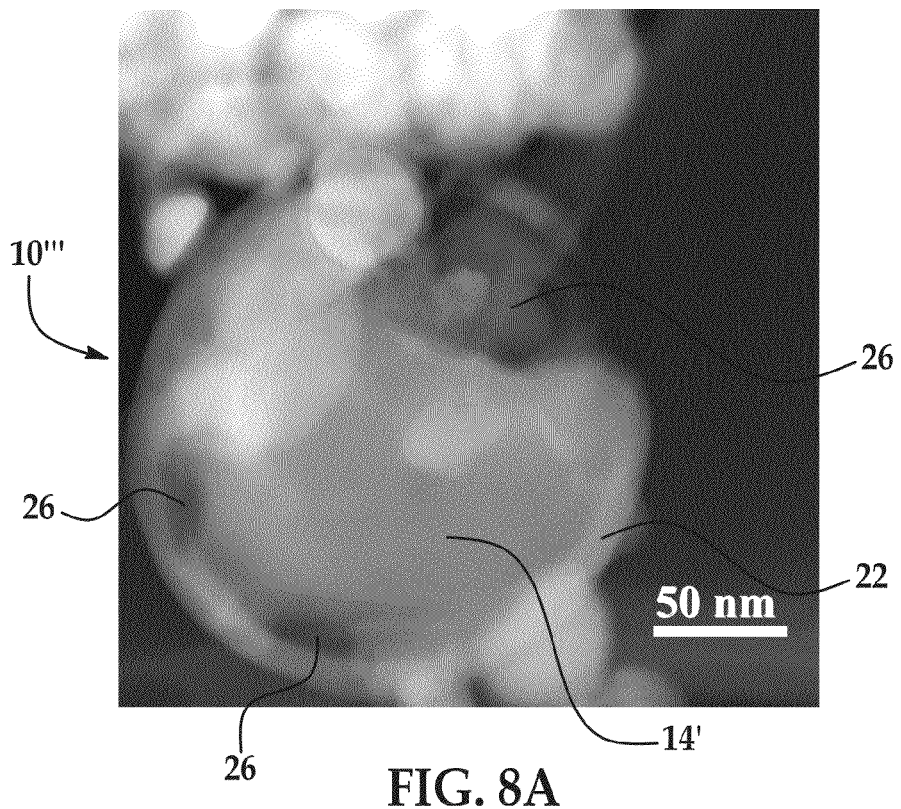
FIG. 8A is a transmission electron microscopy ("TEM") image of the negative electrode active material formed from one example of the methods disclosed herein where silicon atoms diffuse from within the silicon particle.
Figure 8B:
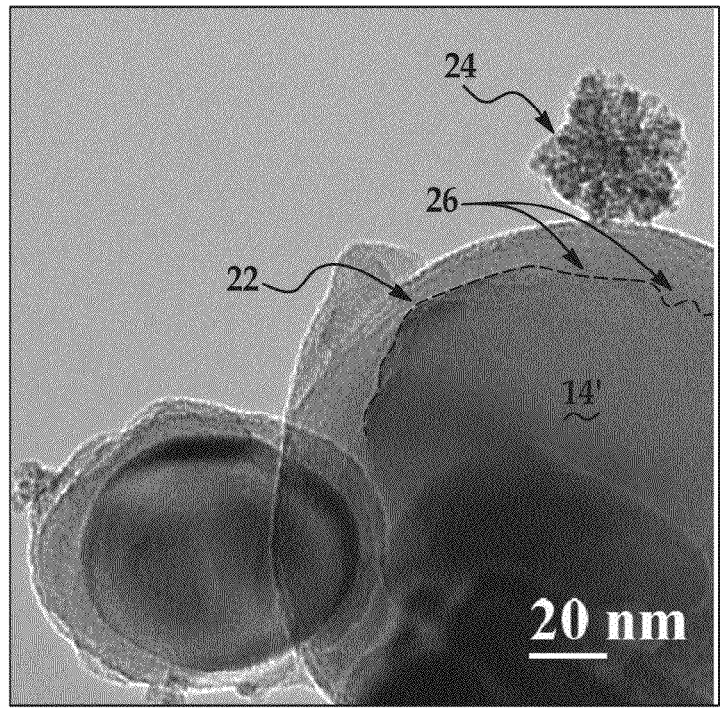
FIG. 8B is a TEM image of silicide particles formed outside of the negative electrode active material formed from one example of the methods disclosed herein where silicon atoms diffuse from within the silicon particle.
Figure 8C:
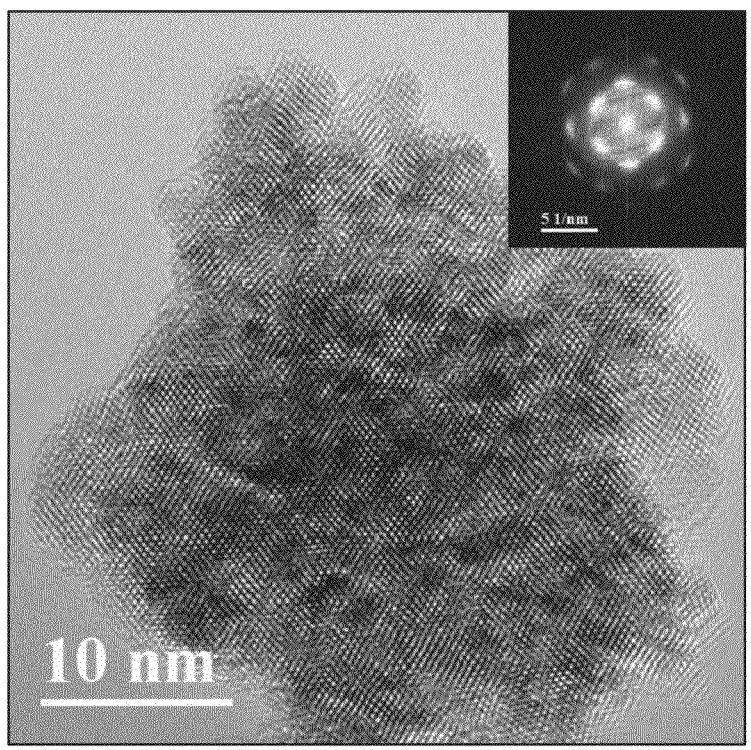
FIG. 8C is a high resolution TEM image of the silicide particles of FIG. 8B, where the inset is a fast Fourier transform ("FFT") of the high resolution TEM image showing a lattice spacing of about 3.3 Å, which belongs to the {111} or {011} atomic planes of the silicide particles.
Figure 9:
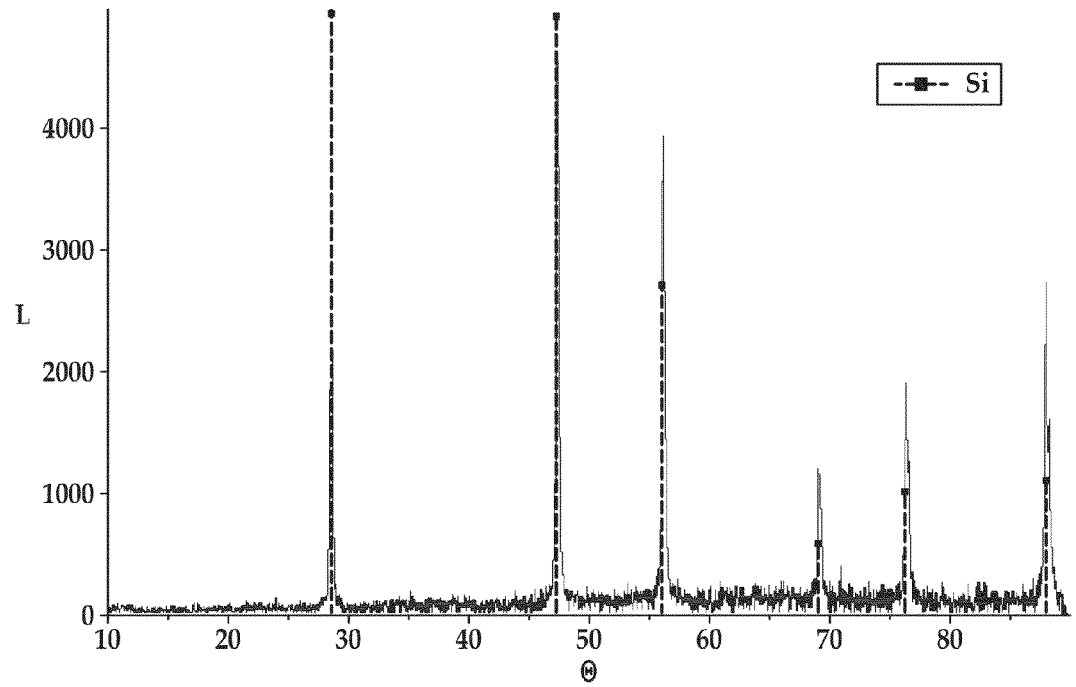
FIG. 9 is a graph obtained from an X-ray diffraction ("XRD") of a comparative negative electrode active material.
Figure 10:
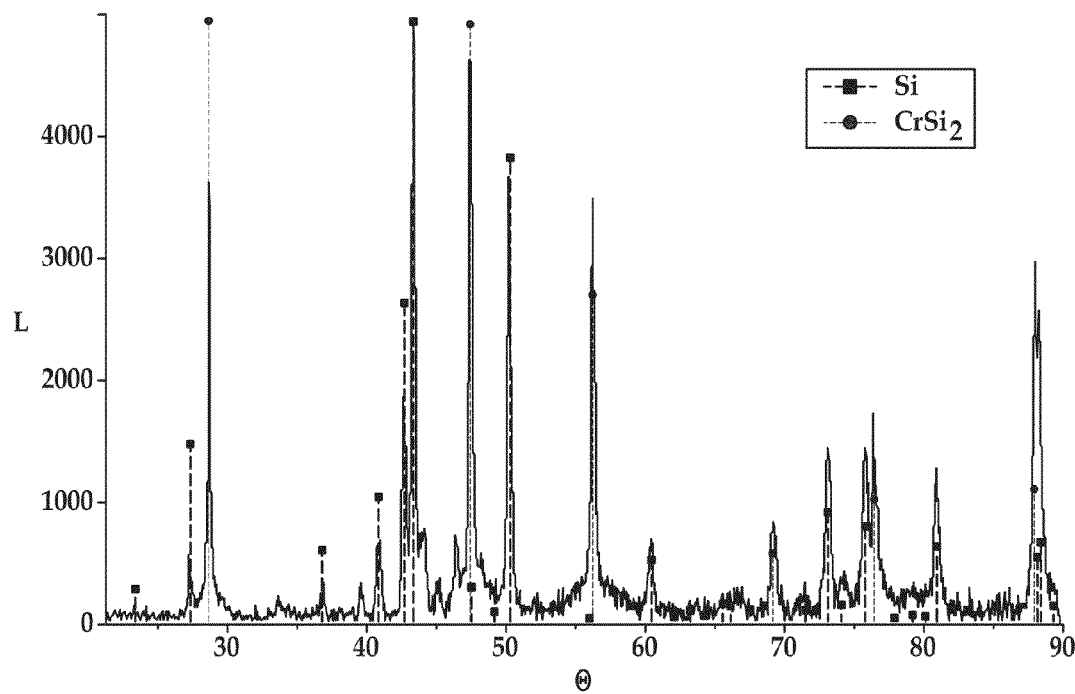
FIG. 10 is a graph obtained from an XRD of the negative electrode active material formed from one example of the methods disclosed herein.
Figure 11A:
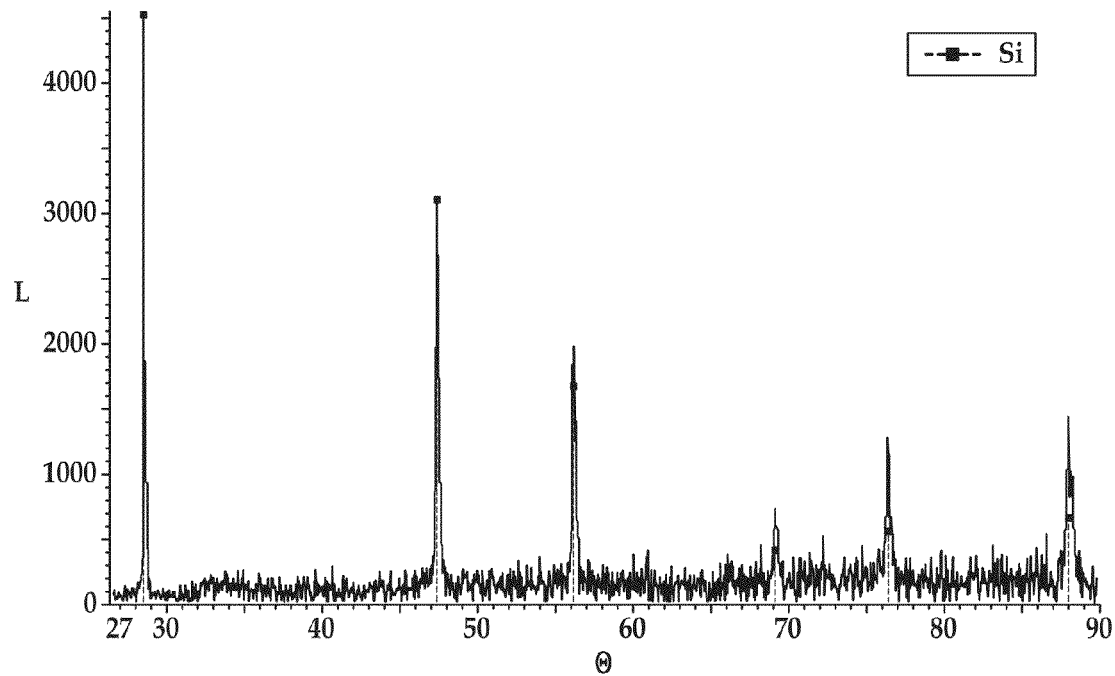
FIGS. 11A-11C are graphs respectively obtained from an XRD of silicon particles and a metal hydroxide precipitate prior to silicide formation (FIG. 11A), an example of the negative electrode active material precursor having silicides formed therein (FIG. 11B), and the negative electrode active material formed after the silicides are removed from the precursor (FIG. 11C)
Figure 11B:
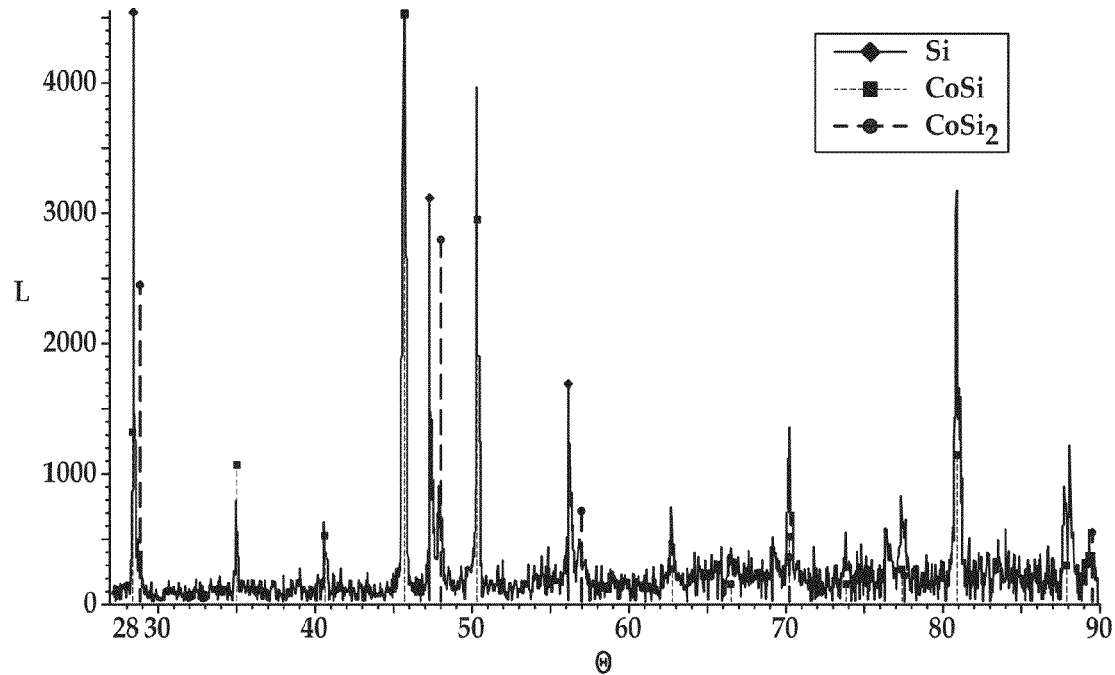
Figure 11C:
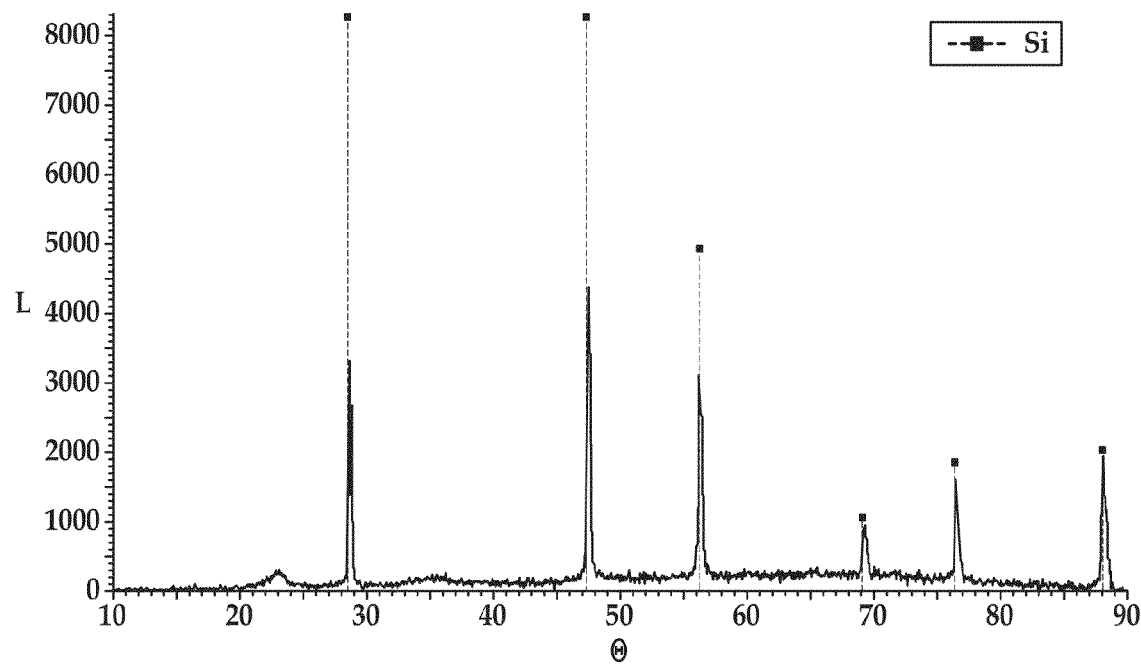
Figure 12A:
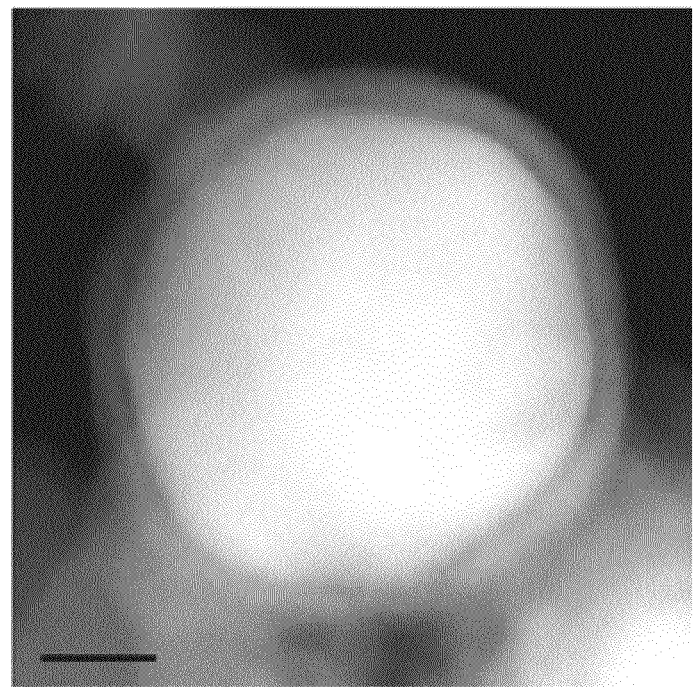
FIGS. 12A-12C are TEM images of a silicon particle, a silicon particle with silicides formed within the silicon particle, and a silicon particle with voids formed within the silicon particle, respectively.
Figure 12B:
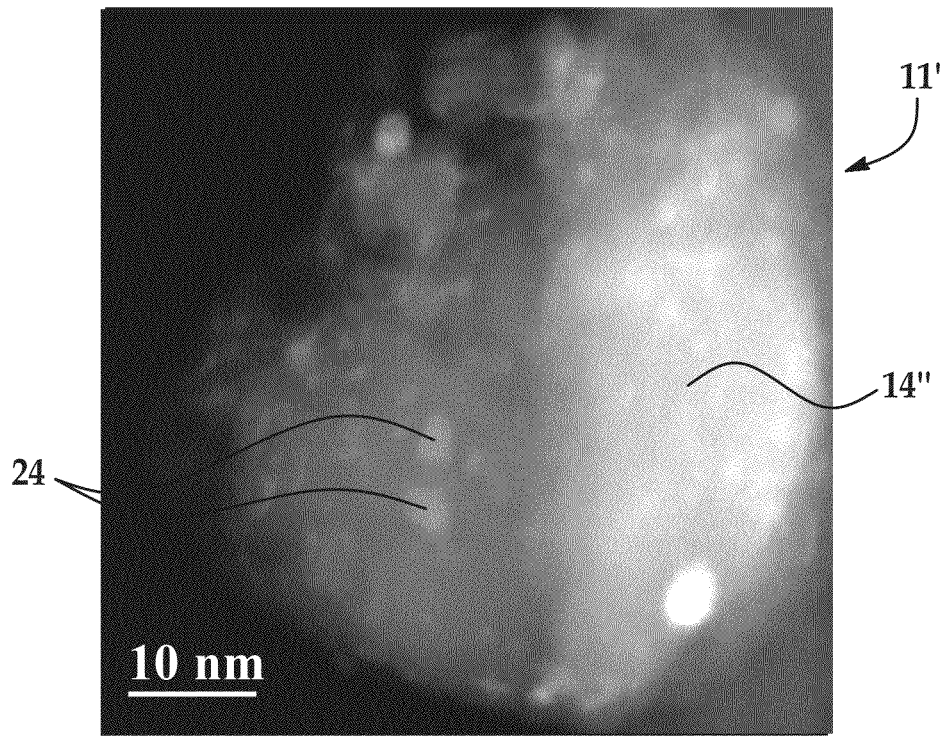
Figure 12C:
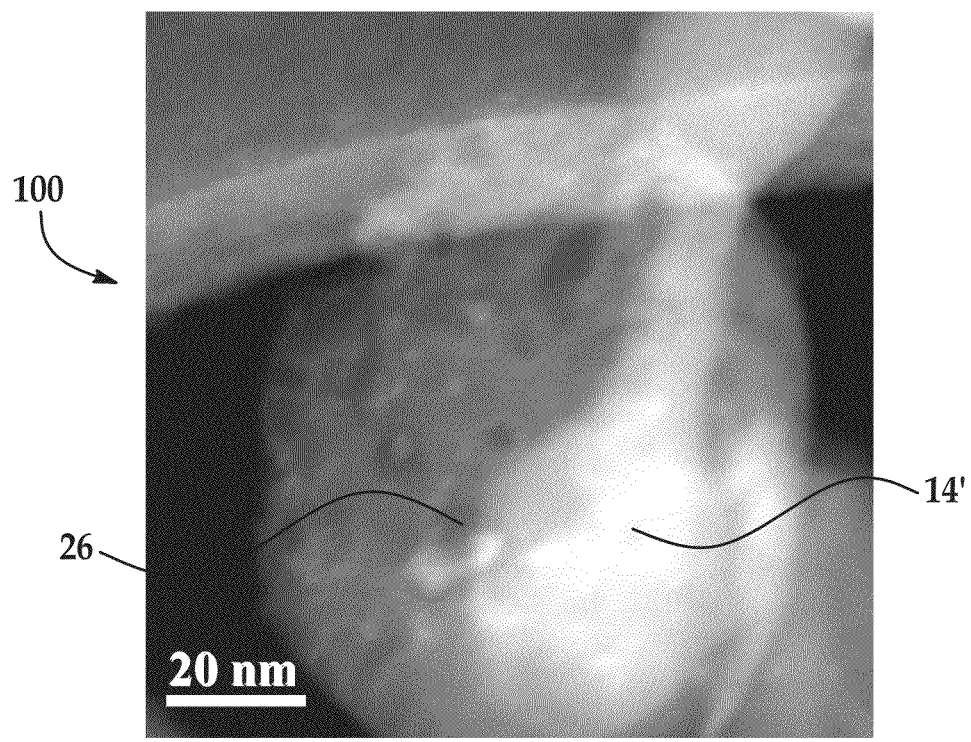
Figure 13:
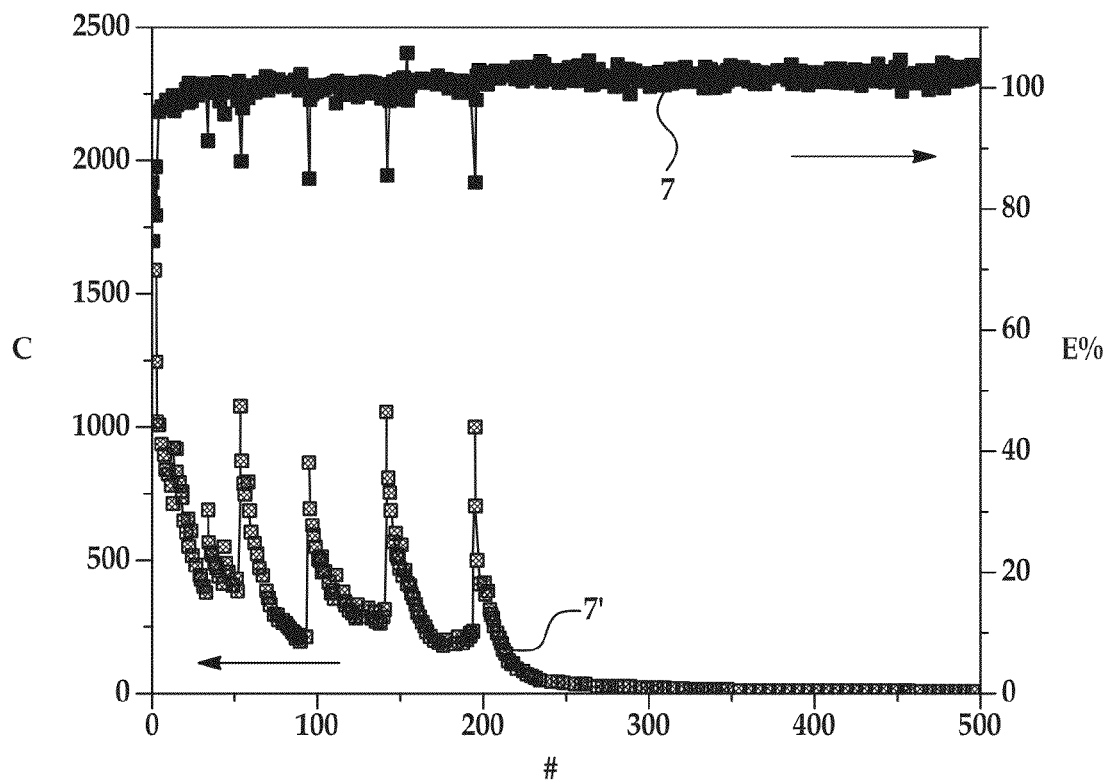
FIG. 13 is a graph of the cycling stability of a comparative negative electrode active material.
Figure 14:
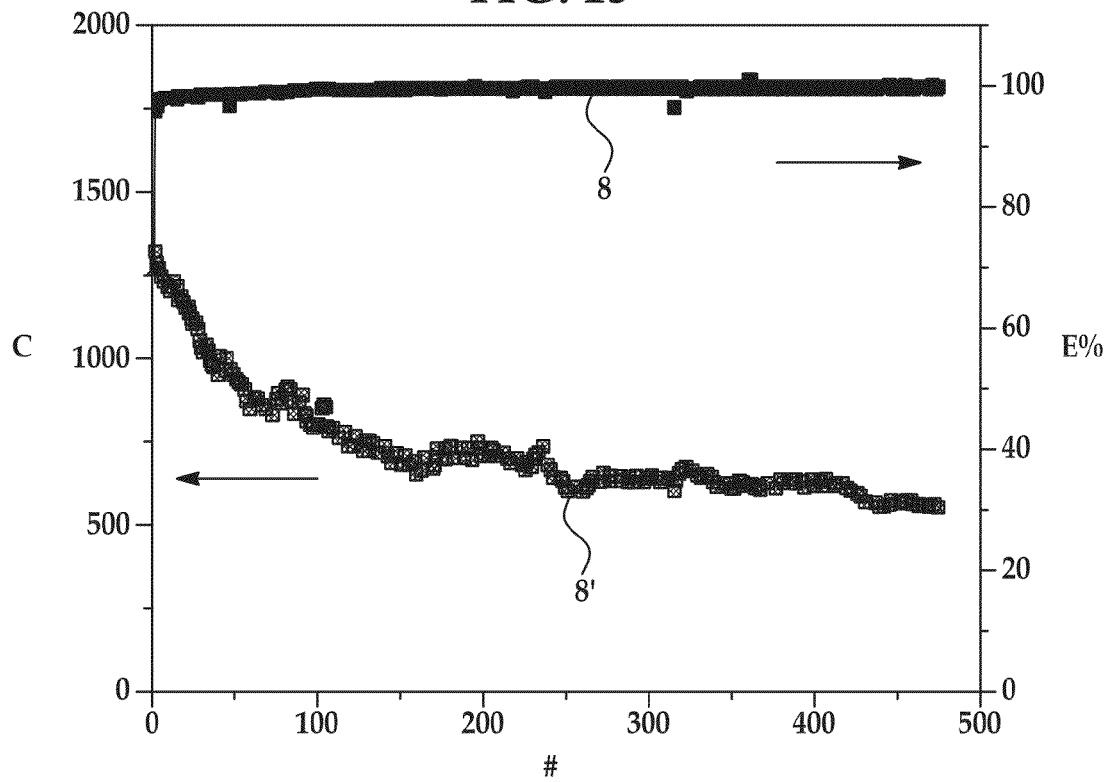
FIG. 14 is a graph of the cycling stability of the negative electrode active material formed from an example of the methods disclosed herein.

Various examples of the negative electrode active materials disclosed herein were prepared using the methods disclosed herein. Images of some of the negative electrode active material precursors and the active material were obtained using transmission electron microscopy ("TEM"). In particular, FIGS. 8A and 8B illustrate an example of the active material 10' (where FIG. 8B also shows the silicides), FIG. 8C illustrates the silicide nanoparticles, FIG. 12A illustrates a comparative silicon particle, FIG. 12B illustrates an example of the precursor 11', and FIG. 12C illustrates an example of the active material 100. In addition, X-ray diffraction ("XRD") was performed on an example of the active material precursor disclosed herein and a comparative example. The results of the XRD of the comparative example and the example of the active material precursor are shown in FIGS. 9 and 10, respectively. XRD was also performed at various points throughout an example of the method for making the active material precursor disclosed herein. FIGS. 11A-11C illustrate the results of these XRD results. Also, an example negative electrode was prepared with an example of the active material disclosed herein, and a comparative negative electrode was prepared with a comparative active material. Both electrodes were tested for the specific charge capacity during charging and discharging. The performance results of the negative electrode and the comparative negative electrode are shown in FIGS. 13 and 14, respectively.

Example 1

FIGS. 8A-10

In this example, the active material precursor 11 and active material 10''' was prepared using the method disclosed herein in reference to FIGS. 1A-1D. More particularly, the active material precursor 11 was formed by adding 3.5587 grams of $Cr(NO_3)_3 \cdot 9H_2O$ (i.e., transition metal precursor) to 200 mL of D.I. water in a beaker. The 3.5587 grams of $Cr(NO_3)_3 \cdot 9H_2O$ in water was stirred for 10 minutes using a magnetic stir bar until the chromium nitrate was completely dissolved. 2 grams of silicon particles were added to the aqueous solution to form a mixture. Isopropyl alcohol was also added to the aqueous mixture to wet the silicon particles and ensure better dispersion. Then, a 140 mL of 1 M sodium hydroxide (NaOH) was added drop by drop to the aqueous mixture of silicon particles, transition metal precursor, and D.I. water to form a product including the silicon particles and a precipitate of $Cr(OH)_3$ (chromium hydroxide). The aqueous solution was separated from the $Cr(OH)_3$ precipitate and silicon particles by filtering the aqueous mixture using a filter paper. The $Cr(OH)_3$ precipitate and silicon particles (i.e., the product) were washed three times and dried at 60° C. overnight.

After the $Cr(OH)_3$ precipitate and silicon particles were dry, the $Cr(OH)_3$ precipitate and silicon particles were placed in an inert environment of argon gas and heated to 1000° C. for 5 hours. This formed an example of the precursor 11. The silicides were removed using $H_2O_2$ and $CH_3COOH$ to form the active material 10'''. TEM images were taken before and after silicide removal.

FIG. 8A is the TEM image of the active material 10''' that was formed as a result of heating and silicide removal, which includes the silicon particle 14' with voids 26 and the $SiO_x$ layer 22. FIG. 8B is the TEM image of the precursor 11 to the active material 10''' that was formed as a result of heating and prior to silicide removal. As illustrated in FIG. 8B, the precursor 11 includes the silicon particle 14' with voids 26 and the $SiO_x$ layer 22 as well as silicides 24. The heat caused silicon atoms to diffuse out of the silicon particles, since chromium (of the $Cr(OH)_3$) has a diffusion rate that is slower than the diffusion rate of silicon. The diffusion of silicon out of the particle caused voids 26 to form within and/or on the silicon particle 14'. The diffused silicon participates in a redox reaction with $Cr(OH)_3$ to reduce the $Cr(OH)_3$ to $Cr^{3+}$ ions and then chromium atoms, which react with excess silicon atoms to form silicides ($CrSi_2$) shown in FIGS. 8B and 8C) outside the silicon particle 14'. Furthermore, the reactions initiated by heating caused a $SiO_x$ coating layer 22 to form surrounding the silicon particle 14' having the voids 26 therein and thereon.

Before exposing the active material precursors 11 to $H_2O_2$ and $CH_3COOH$ to remove the silicides ($CrSi_2$) formed outside the silicon particle, XRD results were acquired for the precursors 11. These results are shown in FIG. 10. XRD was also performed on a comparative example of pristine silicon particles. These results are shown in FIG. 10.

FIGS. 9 and 10 depict the diffracted intensity (counts) (Y axis labeled "L") versus the angle of diffraction (2-theta) (X axis labeled as "Θ") for the comparative example and the active material precursor 11/active material 10'''. The angle of diffraction (Θ) indicates a specific compound, material, molecule, atom etc. that is present in the sample because the specific compound, etc. diffracts x-rays at an angle unique to that compound, material, molecule, atom etc., which is due, in part, to the atoms', structure or arrangement of atoms in a compound, molecule, material etc.

The actual XRD results are shown in solid line in each of FIGS. 9 and 10. The presence of silicon atoms is highlighted in both the comparative example in FIG. 9 and the active material precursor 11 in FIG. 10 by the thicker dashed line with a square. In FIG. 10, the presence of the silicides ($CrSi_2$) is highlighted by the smaller dashed line with a circle.

The difference between FIG. 9 and FIG. 10 is that silicides ($CrSi_2$) are present along with the active material precursor 11 shown in FIG. 10. The presence of the silicides ($CrSi_2$) in FIG. 10 and the TEM images of FIGS. 8A and 8B, demonstrate that the formation of silicides ($CrSi_2$) occurred outside the silicon particle due, in part, to chromium having a slower diffusion rate than silicon. Since the silicon atoms diffused out of the silicon particle and silicide ($CrSi_2$) formation occurred outside the silicon particle, the silicon particle 14' was formed with voids 26 and a $SiO_x$ layer 22.

Example 2

FIGS. 11A-14

In this example, the active material precursor 11' was prepared using the method disclosed herein in reference to FIGS. 3A-3D. An example of the active material 100 was then prepared using the method disclosed herein in reference to example 5 in FIG. 4. Bare silicon nanoparticles were used for comparison.

The active material 100 was formed by adding 1.0583 grams of $Co(NO_3)_2 \cdot 6H_2O$ (i.e., transition metal precursor) to 200 mL of D.I. water. The $Co(NO_3)_2 \cdot 6H_2O$ was stirred for 10 minutes using a magnetic stir bar until the cobalt nitrate was completely dissolved in the water. Then 1 gram of silicon particles was added to form the aqueous mixture. Isopropyl alcohol was also added to the aqueous mixture to wet the silicon particles. Then, a 20 mL of 1 M sodium hydroxide (NaOH) was added drop by drop to the aqueous mixture of silicon nanoparticles, transition metal precursor, and D.I. water to form a precipitate of $Co(OH)_2$ (cobalt hydroxide).

The aqueous medium was separated from the Co(OH)$_2$ precipitate and silicon particles by filtering using a filter paper. The Co(OH)$_2$ precipitate and silicon particles were washed three times and dried at 60° C. overnight.

Prior to placing the silicon particles and Co(OH)$_2$ precipitate into an inert environment and subjecting them to heating, XRD results were acquired for the silicon particles and Co(OH)$_2$ precipitate. The results are shown in FIG. 11A. FIG. 11A depicts the diffracted intensity (counts) (Y axis labeled "L") versus the angle of diffraction (2-theta) (X axis labeled as "Θ") for the Co(OH)$_2$ precipitate and silicon particles.

The actual XRD results are shown in solid line in FIG. 11A. In FIG. 11A, the presence of silicon is highlighted by the thin dashed line with a square. The Co(OH)$_2$ precipitate is amorphous or is present as extremely small crystallites. The amorphous or small crystalline structure of the Co(OH)$_2$ precipitate does not have a clearly defined lattice pattern. As such, the Co(OH)$_2$ precipitate did not appear in the results of the XRD of FIG. 11A.

The silicon particles and the Co(OH)$_2$ precipitate were placed in an inert environment of argon gas and heated to 1000° C. for 5 hours.

The heat initiated the reduction of the Co(OH)$_2$ precipitate via silicon at the surface of the silicon particles. The reduced Co(OH)$_2$ precipitate forms cobalt atoms, which diffuse into the silicon particles since cobalt has a diffusion rate that is faster than the diffusion rate of silicon. The diffused cobalt caused the formation of silicides 24 (CoSi$_2$ and CoSi) inside the silicon particle 14". Hydroxide ions or water from the reduced Co(OH)$_2$ precipitate also caused the formation of a SiO$_x$ coating layer 22 surrounding the silicon particle 14". After five hours of heating, the active material precursor 11' was formed. The active material precursor 11' that was obtained is shown in the TEM image of FIG. 12B. It is to be understood that this particular TEM image was taken with a low magnification. The low magnification in combination with the thinness of the SiO$_x$ coating layer 22 resulted in this layer not being visible in FIG. 12B.

Additionally, XRD results were obtained for the active material precursor 11', and the XRD results are shown in FIG. 11B. FIG. 11B depicts the diffracted intensity (counts) (Y axis labeled "L") versus the angle of diffraction (2-theta) (X axis labeled as "Θ") for the silicides 24 (CoSi and CoSi$_2$) and silicon particles 14".

The actual XRD results are shown in solid line in FIG. 11B. The presence of silicon in FIG. 11B is indicated by the thinner solid line with a triangle. Two types of silicides were formed during the formation of the active material precursor 11'. A CoSi silicide and a CoSi$_2$-silicide were the two silicides that were formed within the silicon particles. In FIG. 11B, the CoSi silicide is identified by a thin dashed line with a square, and the CoSi$_2$ silicide is identified by a thicker dashed line with a circle. FIG. 11B demonstrates that the silicides are produced during the formation of the active material precursor 11'.

The SiO$_x$ coating layer 22 and the silicides 24 were leached or etched from the silicon particle 14". The active material precursor 11' was added to a copious 1M solution containing hydrogen peroxide (H$_2$O$_2$), hydrogen fluoride (HF, hydrofluoric acid), and acetic acid (CH$_3$COOH) (in excess) to remove the SiO$_x$ coating layer 22 and the silicides 24 from the silicon particle 14". After adding the active material precursor 11', the solution is mixed for a time ranging from about 30 minutes to about 3 hours. Voids 26 and silicon coating 22 removal result from the etching/leaching (i.e., removal). The resulting active material 100 is shown in the TEM image of FIG. 12C.

After obtaining the active material 100 shown in FIG. 11C, XRD results were obtained for the active material 100. FIG. 11C depicts the diffracted intensity (counts) (Y axis labeled "L") versus the angle of diffraction (2-theta) (X axis labeled as "Θ") for the active material 100.

The actual XRD results are shown in solid line in FIG. 11A. The presence of silicon in FIG. 11C is highlighted by the thin dashed line with a square. Weak reflections, which are indicated by a low count, can be seen in FIG. 11C, but are not marked. It is believed that the weak reflections are trace amounts of the remaining silicides 24 (CoSi and CoSi$_2$). Overall, the results in FIG. 11C demonstrate the removal of the silicides 24 from the silicon particles 14" and the formation of the active material 100.

For comparison, the TEM image of a silicon particle (without any treatment) is shown in FIG. 12A. There are no voids formed in the silicon particle.

The bare silicon nanoparticles (50 nm to about 70 nm in diameter) were used in a comparative negative electrode and the active material 100 formed in this Example were used in an example electrode. The comparative negative electrode and the example negative electrode were tested, and the cycling stability performance in FIGS. 13 and 14, respectively. Both the comparative negative electrode and the example negative electrode included 70 wt % of the respective active materials, 15 wt % of a conductive filler (SuperP), and 15 wt % of a binder (PVDF).

To form the negative electrodes, the active material, the binder, and the conductive filler were mixed in the solvent, N-methyl-2-pyrrolidone (NMP), to form a dispersion. The dispersion was deposited on a copper current collector, dried overnight in vacuum at about 60° C.

Each of the comparative negative electrode and the negative electrode was used with a lithium metal positive electrode to construct half cells. Coin cells (2032 hardware) were assembled inside an Ar-filled glovebox. Microporous tri-layered polypropylene (PP) and polyethylene (PE) polymer membranes (Celgard 2032, available from Celgard) was used as the separator. The electrolyte consisted of 1 M LiPF$_6$ in a mixed solution of ethylene carbonate (EC), diethyl carbonate (DEC) (1:1 volume ratio), containing 10% fluoroethylene carbonate (FEC).

The coin cells were held at 30° C. to perform electrochemical cycling tests. The cycling tests were carried out at a rate of C/10 and were cycled within the voltage window of 0.05V to 1V for at least 475 cycles.

FIGS. 13 and 14 depict the discharge capacity (mAh/g) (Y axis labeled "C" on the left side) versus the cycle index (X axis labeled "#") for the coin cells including the comparative example negative electrode and the example negative electrode with the active material 100. The columbic efficiency (%) (Y axis labeled "E %" on the right side) is also shown. The discharge capacity (labeled "7") and the columbic efficiency (labeled "7'") of the comparative example negative electrode are shown in FIG. 13. The discharge capacity (labeled "8") and the columbic efficiency (labeled "8'") of the negative electrode using the example active material 100 are shown in FIG. 14.

As illustrated in FIGS. 13 and 14, the cycling stability during charging and discharging improved when the negative electrode included the active material 100 as compared to the comparative the negative electrode using pristine/bare silicon as the active material. This is evidenced by the results in FIG. 14, because there is a more consistent discharge capacity measured after each cycle of charging and discharging the negative electrode. It is believed that the cycling stability improves, in part, because of the silicon particle 14" containing voids 26. The voids 26 allow the active material to better accommodate silicon expansion, thus preventing or at least reducing fracturing, decrepitating, or mechanical degradation of the silicon core.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 30 nm to about 70 nm should be interpreted to include not only the explicitly recited limits of from about 30 nm to about 70 nm, but also to include individual values, such as 35 nm, 60 nm, 65.5 nm, etc., and sub-ranges, such as from about 40 nm to about 55 nm, etc. Furthermore, when "about" is utilized to describe a value, this is meant to encompass minor variations (up to +/−5 nm) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for forming a negative electrode active material, the method comprising:
    selecting a transition metal precursor including a transition metal having a diffusion rate that is slower than a diffusion rate of silicon;
    forming an aqueous mixture by:
        dissolving the transition metal precursor in an aqueous medium; and
        adding silicon particles to the aqueous medium;
    exposing the aqueous mixture to a hydroxide, thereby forming a product including the silicon particles and a transition metal hydroxide precipitate;
    drying the product; and
    in an inert or reducing environment, causing silicon atoms of the silicon particles in the dried product to diffuse out of the silicon particles, thereby forming voids in the silicon particles, on a surface of the silicon particles, or both in the silicon particles and on the surface of the silicon particles, and whereby at least some of the silicon atoms react with the transition metal hydroxide in the dried product to form i) a $SiO_x$ ($0<x\leq2$) coating on the silicon particles and ii) the transition metal, and whereby at least some other of the silicon atoms react with the transition metal to form silicides.

2. The method as defined in claim 1, further comprising removing the $SiO_x$ ($0<x\leq2$) coating from the silicon particles having the voids formed therein, on the surface thereof, or both therein and on the surface thereof.

3. The method as defined in claim 1 wherein the transition metal is selected from the group consisting of chromium, and titanium.

4. The method as defined in claim 1, further comprising forming a carbon coating layer on the $SiO_x$ ($0<x\leq2$) coating.

5. The method as defined in claim 4 wherein the carbon coating layer is a substantially amorphous carbon layer and wherein the carbon coating layer is formed using chemical vapor deposition or a polyol method.

6. The method as defined in claim 4 wherein after forming the carbon coating layer, the method further comprises removing the $SiO_x$ ($0<x\leq2$) coating, thereby forming a gap between the respective carbon coating layers and each of the silicon particles having the voids formed therein, on the surface thereof, or both therein and on the surface thereof.

7. The method as defined in claim 1, further comprising any of:
    i) removing the $SiO_x$ ($0<x\leq2$) coating from the silicon particles having the voids formed therein, on the surface thereof, or both therein and on the surface thereof; or
    ii) forming a carbon coating layer on the $SiO_x$ ($0<x\leq2$) coating to form multi-layered silicon particles having the voids formed therein, on the surface thereof, or both therein and on the surface thereof; or
    iii) forming a carbon coating layer on the $SiO_x$ ($0<x\leq2$) coating; and
    then removing the $SiO_x$ ($0<x\leq2$) coating to form carbon-coated silicon particles having the voids formed therein, on the surface thereof, or both therein and on the surface thereof.

8. The method as defined in claim 7, further comprising incorporating the silicon particles having the voids formed therein, on the surface thereof, or both therein and on the surface thereof, or the multi-layered silicon particles, or the carbon-coated silicon particles into a negative electrode of a battery.

9. The method as defined in claim 8 wherein the battery is a lithium ion battery or lithium-sulfur battery.

10. A method for forming a negative electrode active material, the method comprising: selecting a transition metal precursor including a transition metal having a diffusion rate that is faster than a diffusion rate of silicon;
    forming an aqueous mixture by:
        dissolving the transition metal precursor in an aqueous medium; and
        adding silicon particles to the aqueous medium;
    exposing the aqueous mixture to a hydroxide, thereby forming a product including the silicon particles and a transition metal hydroxide precipitate;
    drying the product; and
    in an inert or reducing environment, causing transition metal atoms of the transition metal hydroxide in the dried product to diffuse into the silicon particles, thereby forming silicides in the silicon particles, on a surface of the silicon particles, or both in the silicon particles and on the surface of the silicon particles, and whereby hydroxide ions of the transition metal hydroxide react with silicon atoms at a surface of the silicon particles to form a $SiO_x$ ($0<x\leq2$) coating on the silicon particles; and
    removing the silicides to form voids in the silicon particles, at the surface of the silicon particles, or both in the silicon particles and on the surface of the silicon particles.

11. The method as defined in claim 10, further comprising removing the $SiO_x$ ($0<x\leq2$) coating from the silicon particles having the voids formed therein, on the surface thereof, or both therein and on the surface thereof.

12. The method as defined in claim 10 wherein the transition metal is selected from the group consisting of iron, cobalt, nickel, copper, and vanadium.

13. The method as defined in claim 10, further comprising forming a carbon coating layer on the $SiO_x$ ($0<x\leq2$) coating.

14. The method as defined in claim 13, wherein the carbon coating layer is a substantially amorphous carbon layer and wherein the carbon coating layer is formed using chemical vapor deposition or a polyol method.

15. The method as defined in claim 13 wherein the carbon coating layer is formed prior to removing the silicides, and wherein after the carbon coating layer is formed, the method further comprises removing the $SiO_x$ ($0<x\leq2$) coating simultaneously with the removing of the silicides, thereby forming a gap between the respective carbon coating layers and each of the silicon particles having the voids formed therein, on the surface thereof, or both therein and on the surface thereof.

16. The method as defined in claim 10, further comprising any of:
   i) removing the $SiO_x$ ($0<x\leq2$) coating simultaneously with the removing of the silicides, thereby forming the silicon particles having the voids therein, on the surface thereof, or both therein and on the surface thereof; or
   ii) forming a carbon coating layer on the $SiO_x$ ($0<x\leq2$) coating prior to removing the silicides; and
   then removing the $SiO_x$ ($0<x\leq2$) coating simultaneously with the removing of the silicides, thereby forming carbon-coated silicon particles having the voids formed therein, on the surface thereof, or both therein and on the surface thereof.

17. The method as defined in claim 16, further comprising incorporating the silicon particles having the voids formed therein, on the surface thereof, or both therein and on the surface thereof or the carbon-coated silicon particles having the voids formed therein on the surface thereof, or both therein and on the surface thereof into a negative electrode of a battery.

18. The method as defined in claim 17, wherein the battery is a lithium ion battery or lithium-sulfur battery.

19. The method as defined in claim 10 wherein removing the silicides is accomplished via oxidation and leaching.

* * * * *